: United States Patent (10) Patent No.: US 7,755,834 B2
Koyanagi et al. (45) Date of Patent: Jul. 13, 2010

(54) WAVELENGTH-SELECTIVE DIFFRACTION ELEMENT AND OPTICAL HEAD DEVICE INCORPORATING THE SAME

(75) Inventors: Atsushi Koyanagi, Fukushima (JP);
Hiromasa Sato, Fukushima (JP);
Yukihiro Tao, Fukushima (JP); Koji Miyasaka, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/139,827

(22) Filed: Jun. 16, 2008

(65) Prior Publication Data

US 2008/0316600 A1 Dec. 25, 2008

Related U.S. Application Data

(63) Continuation of application No. PCT/JP2006/324873, filed on Dec. 13, 2006.

(30) Foreign Application Priority Data

Dec. 15, 2005 (JP) ............................. 2005-361987
Sep. 7, 2006 (JP) ............................. 2006-243139

(51) Int. Cl.
*G02B 5/18* (2006.01)
*G02B 27/44* (2006.01)
(52) U.S. Cl. ................. 359/566; 369/44.37; 369/112.03
(58) Field of Classification Search ................. 359/566; 369/44.37, 112.03
See application file for complete search history.

(56) References Cited

U.S. PATENT DOCUMENTS

2004/0125454 A1* 7/2004 Kawasaki et al. ........... 359/569

(Continued)

FOREIGN PATENT DOCUMENTS

JP 4-129040 4/1992

(Continued)

OTHER PUBLICATIONS

U.S. Appl. No. 12/195,889, filed Aug. 21, 2008, Sato et al.

(Continued)

*Primary Examiner*—Joshua L Pritchett
(74) *Attorney, Agent, or Firm*—Oblon, Spivak, McClelland, Maier & Neustadt, L.L.P.

(57) ABSTRACT

The present invention provides a wavelength-selective diffraction element, configured such that light having a plurality of wavelengths are incident thereon as incident light, which is provided with: a transparent substrate; a concavo-convex part, formed on the transparent substrate such that concave portions and convex portions are cyclically extended in one direction, and comprised of a first material which is optically isotropic; and a filling part, filling at least the concave portions and comprised of a second material which is optically isotropic. The first material and the second material have no absorbance with respect to the wavelengths of the incident light. The first material and the second material have an identical refractive index with respect to light having a first wavelength which is at least one of the wavelengths of the incident light. The first material and the second material have different refractive indices with respect to light having a second wavelength which is at least one of the wavelengths of the incident light and different from the first wavelength.

18 Claims, 16 Drawing Sheets

U.S. PATENT DOCUMENTS

2005/0105183 A1* 5/2005 Hayashi .................. 359/571
2006/0018242 A1* 1/2006 Tomiyama et al. ....... 369/272.1
2007/0121210 A1 5/2007 Sato

FOREIGN PATENT DOCUMENTS

| JP | 2002-318306 | 10/2002 |
| JP | 2002-318306 | * 12/2002 |
| JP | 2002-350625 | 12/2002 |
| JP | 2004-79146 | 3/2004 |
| JP | 2004-138895 | 5/2004 |
| JP | 2005-339762 | 12/2005 |
| WO | WO 98/13826 | 4/1998 |
| WO | WO 2004/097816 A1 | 11/2004 |
| WO | WO 2005/117001 A1 | 12/2005 |

OTHER PUBLICATIONS

U.S. Appl. No. 12/422,051, filed Apr. 10, 2009, Nashi.
U.S. Appl. No. 12/574,131, filed Oct. 6, 2009, Murata et al.

* cited by examiner

WAVELENGTH-SELECTIVE DIFFRACTION ELEMENT AND OPTICAL HEAD DEVICE INCORPORATING THE SAME

TECHNICAL FIELD

The present invention relates to a wavelength-selective diffraction element that can selectively diffract light of a plurality of wavelengths different from one another, and to an optical head device incorporating such a wavelength-selective diffraction element.

BACKGROUND ART

A conventional wavelength-selective diffraction element comprises a glass substrate and a dielectric material cyclically formed on the glass substrate. For incident light having a first wavelength, the length of an optical path difference between a part having the dielectric material formed on the glass substrate and a part having no dielectric material is set to a value integer times as large as the first wavelength to transmit the incident light having the first wavelength. For the incident light having a second wavelength, the above-described length of the optical path difference is set to a value non-integer times as large as the second wavelength to diffract the incident light having the second wavelength (for instance, see Patent Document 1).

However, in the wavelength-selective diffraction element disclosed in the Patent Document 1, since a condition that the length of the optical path difference is set, for the incident light of the first wavelength, to the value the integer times as large as the first wavelength restricts a degree of freedom in a design for the incident light of the second wavelength, a problem arises that a degree of freedom in selecting a diffraction efficiency is restricted. To solve this problem, a wavelength-selective diffraction element as disclosed in, for instance, Patent Document 2, is proposed.

The wavelength-selective diffraction element disclosed in the Patent Document 2 comprises a transparent substrate on which a grating is so formed as to be cyclically concavo-convex, and a filling member filling the concavo-convex portion of the grating. Either a concavo-convex member forming the concavo-convex part of the grating or the filling member includes an organic pigment having an absorption edge of light in a range of a wavelength shorter than the first wavelength. The concavo-convex member and the filling member have the same refractive index with respect to the light of one of the first wavelength and the second wavelength to transmit the light of one of the first wavelength and the second wavelength without diffracting the light, and have different refractive indices with respect to the light of the other wavelength to diffract the light of the other wavelength. In the Patent Document 2, it is disclosed an organic pigment that has the absorption edge of light in the range of the wavelength of 580 nm to 600 nm.

Patent Document 1: Japanese Patent Publication No. 4-129040A

Patent Document 2: Japanese Patent Publication No. 2002-318306A

DISCLOSURE OF THE INVENTION

Problems to be Solved by the Invention

However, in the conventional wavelength-selective diffraction element disclosed in the Patent Document 2, since the organic pigment having the absorption edge of light wavelength of 580 nm to 600 nm is used in the concavo-convex member, it is applicable to the light of a 650 nm band and a 790 nm band used respectively in a DVD and a CD. However, in a next generation DVD using, for instance, blue laser light of a 405 nm band, since the blue laser light is absorbed by the concavo-convex member, it is impossible to selectively diffract the light of three wavelengths used in the next generation DVD, the DVD and the CD.

The present invention is made to solve the conventional problem and it is an object of the present invention to provide a wavelength-selective diffraction element and an optical head device that can selectively diffract light of a wavelength range wider than that of a conventional wavelength-selective diffraction element.

How to Solve the Problems

According to the present invention, there is provided a wavelength-selective diffraction element, configured such that light having a plurality of wavelengths are incident thereon as incident light, comprising:

a transparent substrate;

a concavo-convex part, formed on the transparent substrate such that concave portions and convex portions are cyclically extended in one direction, and comprised of a first material which is optically isotropic; and a filling part, filling at least the concave portions and comprised of a second material which is optically isotropic, wherein:

the first material and the second material have no absorbance with respect to the wavelengths of the incident light;

the first material and the second material have an identical refractive index with respect to light having a first wavelength which is at least one of the wavelengths of the incident light; and the first material and the second material have different refractive indices with respect to light having a second wavelength which is at least one of the wavelengths of the incident light and different from the first wavelength.

With this configuration, since the wavelength-selective diffraction element of the present invention can selectively diffract incident light having a plurality of different wavelengths without absorbing the incident light, it is possible to selectively diffract the light of a wavelength range wider than that of the conventional element in which light of a specific wavelength range is absorbed.

Preferably, the wavelength-selective diffraction element of the present invention is configured such that the concavo-convex part and the filling part are formed by materials having different light absorption edge wavelengths.

With this configuration, the wavelength-selective diffraction element of the present invention has the same refractive index to the incident light having at least one of the different wavelengths and different refractive indices to the light of at least one wavelength different from the above-described wavelength.

Preferably, the wavelength-selective diffraction element of the present invention is configured such that a modulus of a value obtained by dividing $[d(\Delta n)/d\lambda_i]$ with $\Delta n$ is 0.05/nm or less, in a case where $\lambda_i$ is one of the wavelengths of the incident light for which the first material and the second as material have different refractive indices, and $\Delta n$ is a difference between the refractive indices of the first material and the second material.

With this configuration, since the wavelength-selective diffraction element of the present invention can suppress the variation ratio of the refractive index difference between the concavo-convex part and the filling part, an operation for selectively diffracting the light of the different wavelengths can be stabilized.

Preferably, the wavelength-selective diffraction element of the present invention is configured such that the concavo-convex part and the filling part have the different refractive indices with respect to light having a wavelength of $\lambda_1$, and have the same refractive index with respect to light having wavelengths of $\lambda_2$ and $\lambda_3$, in a case where $\lambda_1$, $\lambda_2$ and $\lambda_3$ are the wavelengths of the incident light.

With this configuration, since the wavelength-selective diffraction element of the present invention diffracts the light of the wavelength $\lambda_1$ and transmits the light of wavelengths $\lambda_2$ and $\lambda_3$, it is possible to selectively diffract light in a wavelength range wider than that of the conventional wavelength-selective diffraction element in which light of a specific wavelength range is absorbed.

Preferably, the wavelength-selective diffraction element of the present invention is configured such that the concavo-convex part and the filling part have the same refractive index with respect to light having a wavelength of $\lambda_1$, and have different refractive indices with respect to light having wavelengths of $\lambda_2$ and $\lambda_3$, in a case where the wavelengths of the incident light are $\lambda_1$, $\lambda_2$ and $\lambda_3$.

With this configuration, since the wavelength-selective diffraction element of the present invention transmits the light of the wavelength $\lambda_1$ and diffracts the light of the wavelengths $\lambda_2$ and $\lambda_3$, it is possible to diffract light in a wavelength range wider than that of the conventional wavelength-selective diffraction element in which light of a specific wavelength range.

Preferably, the wavelength-selective diffraction element of the present invention is configured such that the concavo-convex part and the filling part are partially formed on an effective area adapted to receive the incident light.

With this configuration, since the wavelength-selective diffraction element of the present invention diffracts, for instance, the light of wavelength $\lambda_1$ and transmits the light of wavelengths $\lambda_2$ and $\lambda_3$ in a part of the effective area where the concavo-convex part and the filling part are formed, the light of a specific wavelength can be attenuated or shielded only in the part of the effective area.

Preferably, the wavelength-selective diffraction element of the present invention is configured such that: the concavo-convex part and the filling part are concentrically formed in an effective area of the transparent substrate adapted to receive the incident light; and a cycle of the concave portions and the convex portions becomes smaller as coming from a center part to an outer peripheral part.

With this configuration, the wavelength-selective diffraction element of the present invention can be provided with a function for allowing the light of a specific wavelength of the incident light having different wavelengths which is to be converged or diffused and the light of another specific wavelength which is to be transmitted straightforward, or a function for allowing a part of the light of the specific wavelength to be selectively diffracted and converged and allowing the remaining part of the light of the specific wavelength and the light of another specific wavelength to be transmitted straightforward.

According to the present invention, there is provided an optical head device, comprising:

a light source, configured to emit light having a plurality of wavelengths;

an objective lens, configured to converge the light to a recording layer of an optical recording medium;

a photo detector, configured to detect light reflected from the optical recording medium; and the above wavelength-selective diffraction element, disposed on either an optical path between the light source and the objective lens or an optical path between the objective lens and the photo detector.

With this configuration, in the optical head device of the present invention, since the wavelength-selective diffraction element selectively diffracts light having different wavelengths, it is possible to selectively diffract light of a wavelength range wider than that of the conventional element in which light of a specific wavelength range is absorbed, so that the compatibility of the optical recording medium can be increased.

ADVANTAGE OF THE INVENTION

The present invention can provide a wavelength-selective diffraction element and an optical head device that can selectively diffract light of a wavelength range wider than that of the conventional element and the device.

DESCRIPTION OF REFERENCE NUMERALS AND SIGNS

Figure 1:
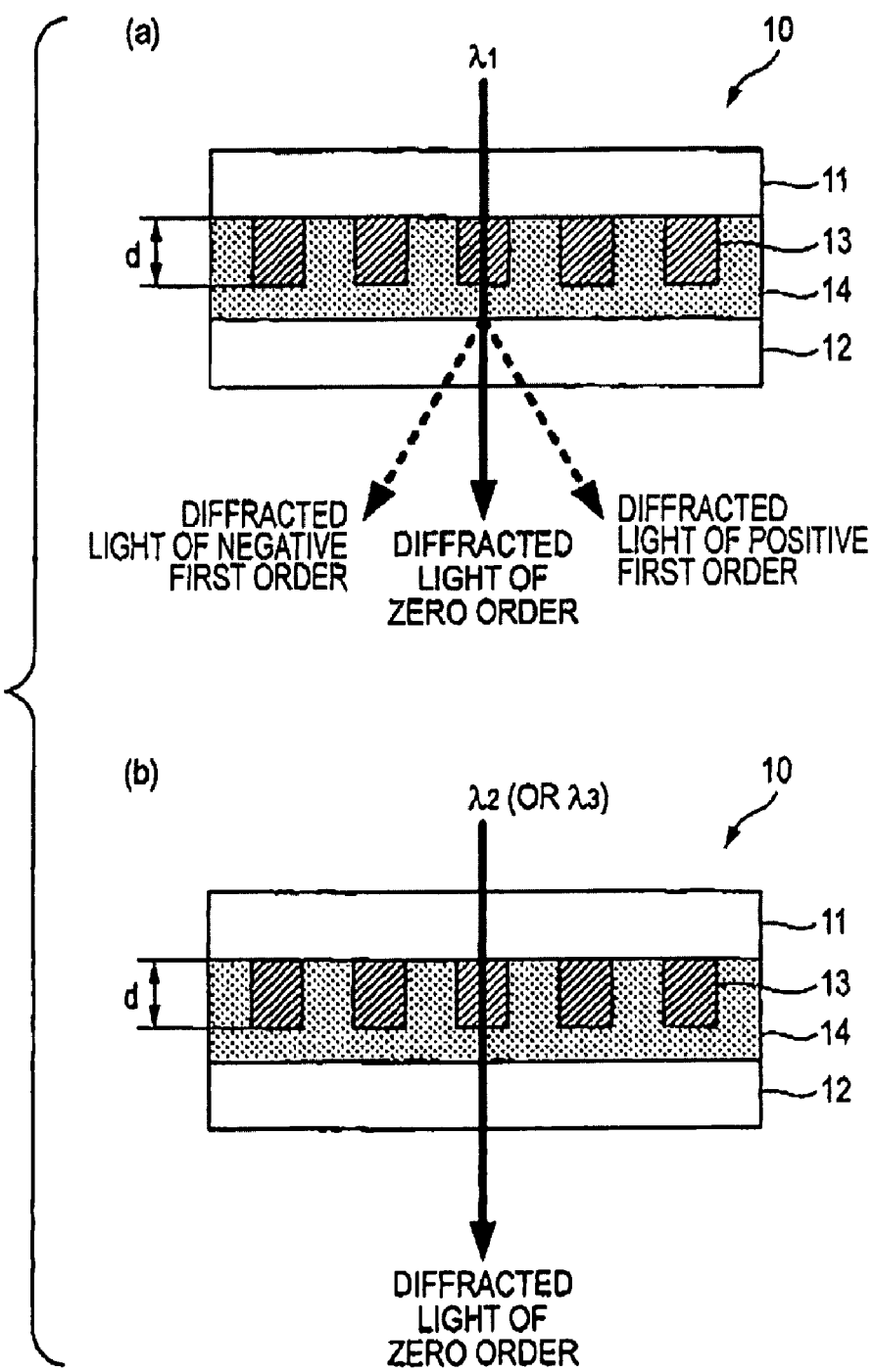
In FIG. 1, (a) is a conceptual view showing a state that incident light of a wavelength $\lambda_1$ is diffracted by a wavelength-selective diffraction element according to a first embodiment of the present invention, and (b) is a conceptual view showing a state that incident light of a wavelength $\lambda_2$ or $\lambda_3$ is transmitted by the wavelength-selective diffraction element according to the first embodiment of the present invention.

10, 20, 30, 40, 50: wavelength-selective diffraction element
11, 12, 21, 22, 51, 52: transparent substrate
13, 23, 53: concavo-convex part
14, 24, 54: filling part
31: grating pattern
41: grating area
100, 300, 400, 500: optical head device
101, 301, 401, 501: light source
102, 302, 402, 502: beam splitter
103, 303, 403, 503: collimator lens
104, 304, 404, 504: objective lens
105, 305, 405, 505: photo detector
110, 310, 410, 510, 510a, 510b: optical disc
111, 311, 511, 511a, 511b: recording layer
405a: light receiving part
406: spot formed by reflected light from desired recording layer
407: spread spot
408: light shielding part
411: first recording layer
412: second recording layer
420: diffraction element

BEST MODE FOR IMPLEMENTING THE INVENTION

Embodiments of the present invention will be described below with reference to the drawings.

First Embodiment

Initially, the structure of a wavelength-selective diffraction element according to a first embodiment of the present invention will be described. In the wavelength-selective diffraction element of this embodiment, examples that the wavelength-selective diffraction element according to this embodiment is applied to the standards of a BD (Blu-ray Disc) or an HD DVD (High Definition DVD) and a DVD and a CD will be explained. In the below description, the BD or the HD DVD is referred to simply as a "BD or the like". Further, wavelengths of light used for reading and writing data on the BD or the like, the DVD and the CD are respectively designated by $\lambda_1, \lambda_2,$ and $\lambda_3$. Here, the light of the wavelengths $\lambda_1, \lambda_2$ and $\lambda_3$ respectively indicate the light of the wavelengths of a 405 nm band, a 660 nm band and a 780 nm band. The wavelengths of the 405 nm band, the 660 nm band and the 780 nm band respectively mean wavelength ranges of 405±15 nm, 660±15 nm and 780±20 nm.

As shown in FIG. 1, the wavelength-selective diffraction element 10 according to this embodiment comprises a pair of transparent substrates 11 and 12, a concavo-convex part 13 formed on the transparent substrate 11 in which concave portions and convex portions are cyclically extended in one direction, and a filling part 14 filling at least the concave portions of the concavo-convex part 13.

The concave portions and the convex portions may extend in the directions parallel to each other or concentrically in a substrate surface. As the sectional form of the concavo-convex part 13, that is, a grating, a rectangular form, a serrate form or a form in which a certain serrate form is approximated by stepwise contours may be employed. A similar grating may be formed on an entire surface of an effective area where light is incident on the substrate surface. Alternatively, the inner part of the substrate surface may be divided and the extending direction or the sectional form of the grating may be changed in each of the divided parts, or the grating may be formed only in a part of the effective area.

In FIG. 1, (a) shows a state that the light of the wavelength $\lambda_1$ is incident on and diffracted by the wavelength-selective diffraction element 10. Further, (b) shows a state that the light of the wavelength $\lambda_2$ or $\lambda_3$ is incident on and transmitted by the wavelength-selective diffraction element 10.

The transparent substrates 11 and 12 adopt a substrate made of a material that does not substantially absorb light of a wavelength used in the wavelength-selective diffraction element 10 of the present invention, and is composed of, for instance, a plastic substrate such as an acrylic substrate, a glass substrate or the like. The transparent substrate is preferably made of the glass substrate in view of ensuring reliability. Further, to reduce a reflection loss, a reflection preventing film may be formed on the interface of the substrate. The transparent substrates 11 and 12 are preferably planes as shown in the drawings from the viewpoint of a mass production. However, the present invention is not limited thereto, and for instance, a substrate may be used whose surface has a curved form, like a plastic lens.

The concavo-convex part 13 and the filling part 14 are respectively composed of an optically isotropic material. Specifically, the concavo-convex part 13 and the filling part 14 are formed with a polymer material such as a polyester material, a polyether material, an acrylic material, an epoxy material, etc. As a polymerization method used when these polymer materials are produced, for instance, a photo-polymerization method or a thermal polymerization method are exemplified. Further, the concavo-convex part 13 have a grating form such as a binary type, a blaze type, a pseudo blaze type and are formed by processing a polymer material film under a lithography and an etching using a photo-mask, a 2P method using a metal mold or a glass mold, an imprinting method, an injection molding method or the like.

Further, the concavo-convex part 13 and the filling part 14 respectively have a light absorbing wavelength range for absorbing light of a prescribed wavelength in a range different from the wavelength ranges of incident light of different wavelengths $\lambda_1$, $\lambda_2$ and $\lambda_3$. Specifically, the concavo-convex part 13 and the filling part 14 respectively have a long-wavelength-side edge of the light absorbing wavelength range shorter than the 405 nm band (405±15 nm). In other words, the long-wavelength-side edge of the light absorbing wavelength range is not contained in the 405 nm band. Namely, the concavo-convex part 13 and the filling part 14 are made of the optically isotropic material that does not absorb all light of the wavelength 405 nm band, the 660 nm band and the 780 nm band exemplified in this embodiment. Here, according to the investigated result of the inventor, the molar absorption coefficient of the polymer material forming the concavo-convex part 13 and the filling party 14 is preferably 10 or smaller in a working wavelength band. The above-described words "not absorb" does not simply represent that an absorption does not absolutely occur, but an absorption may occur within a range allowable in use.

Figure 2:
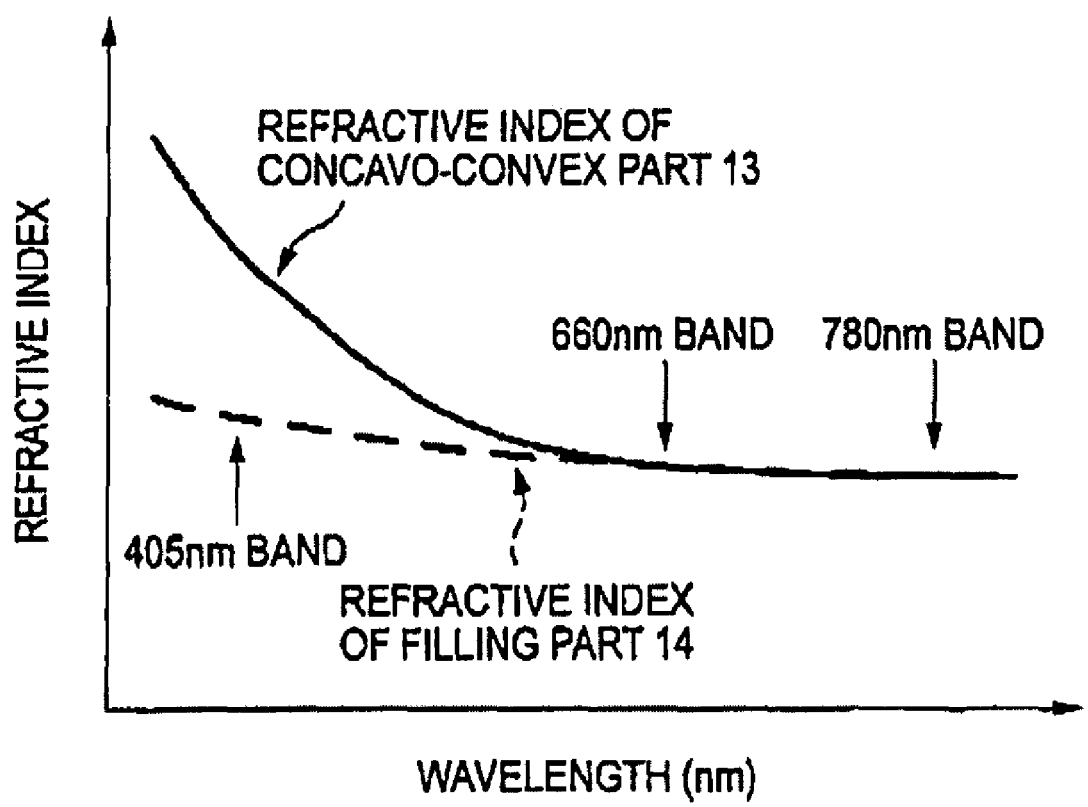
FIG. 2 is a diagram showing a relation between the wavelength and the refractive index of light incident on a concavo-convex part and a filling part in the wavelength-selective diffraction element according to the first embodiment of the present invention.

Further, as shown in FIG. 2, the concavo-convex part 13 and the filling part 14 are made of the polymer material having different refractive indices relative to the incident light of the wavelength 405 nm band and the same refractive index relative to the incident light of the wavelength 660 nm band and the 780 nm band. Accordingly, the wavelength-selective diffraction element 10 according to this embodiment diffracts the incident light of the wavelength 405 nm band, and transmits the incident light of the wavelength 660 nm band and the 780 nm band straightforward. The above-described "same refractive index" is not limited only to the completely coincident refractive index and may be a value considered to be substantially the same in use.

Specifically, the materials of the concavo-convex part 13 and the filling part 14 are selected so that the wavelength of the absorption edge of the concavo-convex part 13 is different from the wavelength of the absorbing end of the filling part 14. Thus, the refractive indices of the concavo-convex part 13 and the filling part 14 can be made to be different from each other. For instance, the wavelength of the absorption edge of the concavo-convex part 13 is set to 290 nm and the wavelength of the absorption edge of the filling part 14 is set to 260 nm, so that the refractive index difference Δn between the concavo-convex part 13 and the filling part 14 in the 405 nm band can be set to about 0.01.

To minimize a zero-order diffraction efficiency, that is, a transmittance of a straightforward light and maximize a first-order diffraction efficiency relative to the incident light of a desired wavelength, a relation of $\Delta n \cdot d = [(2m+1)/2] \cdot \lambda$ (in this case, m is an integer of 0 or larger) is preferably established between the height d of a grating having a rectangular cross section of a diffraction grating, the refractive index difference Δn of the concavo-convex part 13 and the filling part 14 and the wavelength λ of the incident light.

Since, as the refractive index difference Δn is smaller, the height of the diffraction grating, that is, the thickness d of the concavo-convex part 13 in FIG. 1 is increased when the zero-order diffraction efficiency relative to the desired wavelength, that is, the transmittance of the straightforward light is minimized and the first-order diffraction efficiency is maximized, it is recognized in the examination of the inventor that the refractive index difference Δn between the concavo-convex part 13 and the filling part 14 in the wavelength 405 nm band is preferably 0.001 or higher. As the thickness d of the concavo-convex part 13 is more reduced, unevenness in the thickness is increased in a production process. As the thickness of the concavo-convex parts is more increased, the utilization efficiency of light is lowered. Thus, the thickness d of the concavo-convex part 13 is preferably set to 1 μm to 50 μm or so.

Further, according to the investigated result of the inventor, it is found that when the wavelength-selective diffraction element 10 of the present invention is used for the light of a certain wavelength range, a modulus (refer it to as a "wavelength gradient refractive index ratio", hereinafter) of the ratio $[d(\Delta n)/d\lambda_i]/\Delta n$ of the wavelength gradient of the refractive index difference Δn between the concavo-convex part 13 and the filling part 14 in the central wavelength $\lambda_i$, (i=1, 2, 3) of the wavelength range to the refractive index difference Δn is set to 0.05/nm or less to obtain good characteristics over the entire parts of the wavelength range.

For instance, in the wavelength-selective diffraction element 10 of the present invention in which a combination of the materials of the concavo-convex part 13 and the filling material 14 is used with the refractive index difference Δn of 0.01 relative to the light of the wavelength 405 nm band and the height of the grating is set to 20 μm so that the zero-order diffraction efficiency, that is, the transmittance is minimized and the first-order diffraction efficiency is maximized relative to the wavelength, the wavelength gradient refractive index ratio is set to 0.05/nm or less relative to the light of the wavelength of 405 nm. Thus, the refractive index difference Δn relative to the light of a wavelength 400 nm and a wavelength 410 nm is suppressed to a range of ±25%. As a result, the variation of the zero-order diffraction efficiency and the variation of the transmittance in the above-described wavelength range show about 15%, and the variation of the first-order diffraction efficiency shows about 7%. Namely, the variation of the zero-order diffraction efficiency or the transmittance and the variation of the first-order diffraction efficiency can be respectively suppressed to 20% or less, and 10% or less.

When the wavelength-selective diffraction element of the present invention has the above-described structure, good performance can be obtained even if the wavelength of light emitted from a light source used with the wavelength-selective diffraction element is fluctuated in a wavelength range of ±5 nm relative to the central wavelength. The wavelength gradient refractive index ratio is expressed by a differential form, however, in an actual examination, $\Delta\lambda_i$ is considered to be ±5 nm or so as described above to obtain each variation.

Further, according to the investigated result of the inventor, also relative to the variation of temperature, it is suppressed to 20% or less the variation ratio of the refractive index difference between the concavo-convex part 13 and the filling part 14 in a range of working temperature, for instance, −10° C. to 80° C. when the wavelength-selective diffraction element 10 is used in an optical head device, so that the variation of the zero-order diffraction efficiency can be suppressed to 10% or less and the variation of the first-order diffraction efficiency can be suppressed to 5% or less, respectively. Accordingly, when the wavelength-selective diffraction element of the present invention is used with a light source such as a semiconductor laser light source whose output wavelength varies in accordance with the variation of the temperature, during the variation of the temperature, good characteristics can be preferably maintained. Further, when at least one of the concavo-convex part 13 and the filling part 14 is formed in a laminated structure, temperature characteristics can be more improved.

Now, a specific example of the wavelength-selective diffraction element 10 according to this embodiment will be described below. Materials or producing methods or the like described later are mere examples and the present invention is not limited thereto.

Example 1

Initially, on the transparent substrate 11 made of the glass substrate, a film of a first photo-polymerizing polymer is formed under a state of a monomer by a spin coat method. Then, the formed monomer is polymerized by applying a ultraviolet ray to have a photo-polymer and a polymer film having the thickness of 25 µm is formed. Further, the polymer film is formed in the configuration of a grating of a pitch of 12 µm by a dry etching method to obtain the concavo-convex part 13.

Subsequently, the grating-shaped concavo-convex part 13 are filled with a second photo-polymerizing polymer under the state of a monomer, and then, the transparent substrate 12 made of the glass substrate is laminated thereon. Then, the filled monomer is polymerized by applying the ultraviolet ray to obtain the wavelength-selective diffraction element 10.

The above-described first and second photo-polymerizing polymers are any of the polymer materials such as the polyester material, the polyether material, the acrylic material, the epoxy material, etc. or can be obtained by mixing a plurality of the polymer materials. Here, the concavo-convex part 13 and the filling part 14 are produced by using any of the monomers of the polyester material or a material obtained by mixing together a plurality of homogeneous materials or heterogeneous materials so that the refractive indices of the concavo-convex part 13 and the filling part 14 are not coincident with each other in the wavelength 405 nm band and coincident with each other in the wavelength 660 nm band and the 780 nm band as shown in FIG. 2 thereby diffracting the light of the wavelength 405 nm band and transmitting the light of the wavelength 660 nm band and the 780 nm band, and further, such polymerization characteristics can be assured as to ensure reliability such as a light resistance, a durability or the like.

Figure 3:
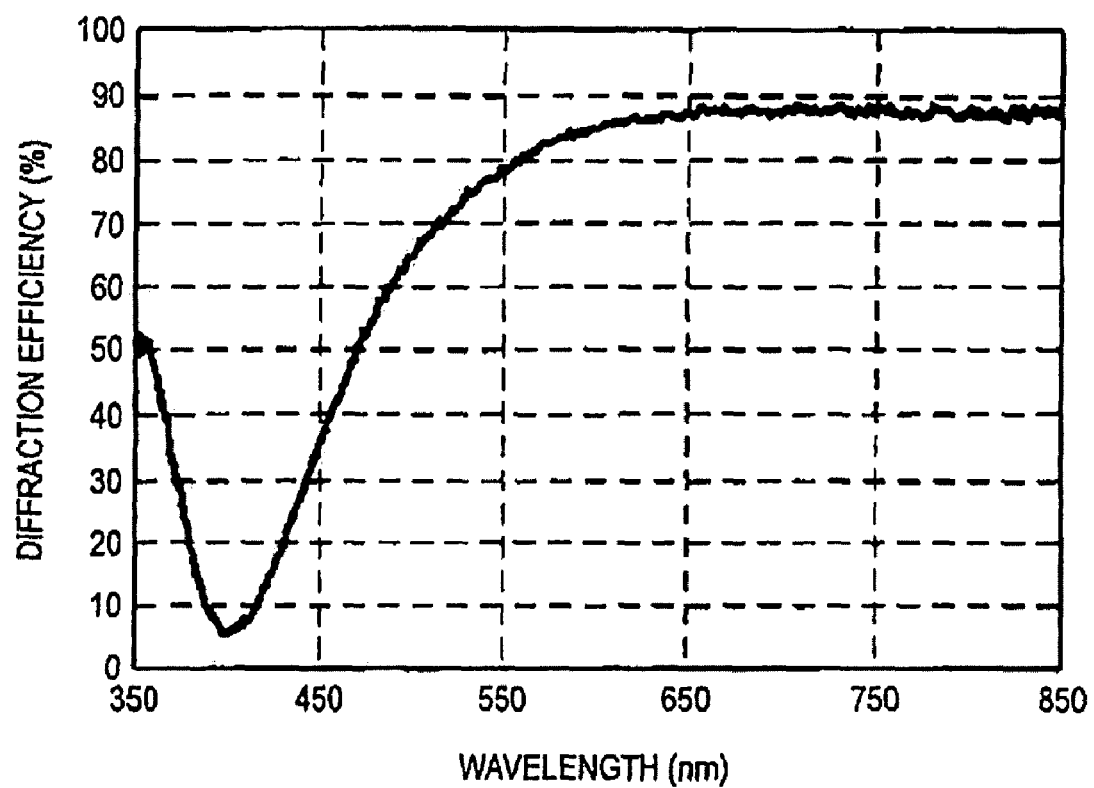
FIG. 3 is a diagram showing the measured result of the transmittance of the wavelength-selective diffraction element according to the first embodiment of the present invention.

When the transmittance of the wavelength-selective diffraction element 10 manufactured under the above-described conditions was measured by using a light source device having a tungsten halogen lamp and a deuterium lamp, and a spectroscope. As a result, as shown in FIG. 3, the transmittance of the light of the wavelength 405 nm band was about 5% and both the transmittances of the light of the wavelength 660 nm band and the 780 nm band were about 87%. Accordingly, the wavelength-selective diffraction element 10 according to this embodiment can diffract the light of the wavelength 405 nm band and transmit the light of the wavelength 660 nm band and the 780 nm band.

Next, a case will be described as an example that the wavelength-selective diffraction element 10 according to this embodiment is mounted on the optical head device to read information recorded on the BD or the like and the DVD. It is assumed that the optical head device uses a three-beam method in a tracking control when the optical head device reads the information recorded on the BD or the like. Specifically, in the wavelength-selective diffraction element 10 of the optical head device according to this embodiment, the concavo-convex part 13 and the filling part 14 are formed with the first and second photo-polymerizing polymers having the refractive index difference Δn of 0.008 relative to the light of the wavelength 405 nm band and the thickness of the concavo-convex part 13, that is, the height of the grating of the diffraction grating is set to 6 µm. The obtained wavelength-selective diffraction element 10 has the light quantity ratio of the light quantity of a zero-order diffracted light and the light quantity of positive and/or negative first-order diffracted light of about 16, and is preferably applied as a three-beam generating diffraction grating. Here, the light quantity of the positive and/or negative first-order diffracted light represents an average light quantity of the positive first-order diffracted light and the negative first-order diffracted light.

Figure 4:
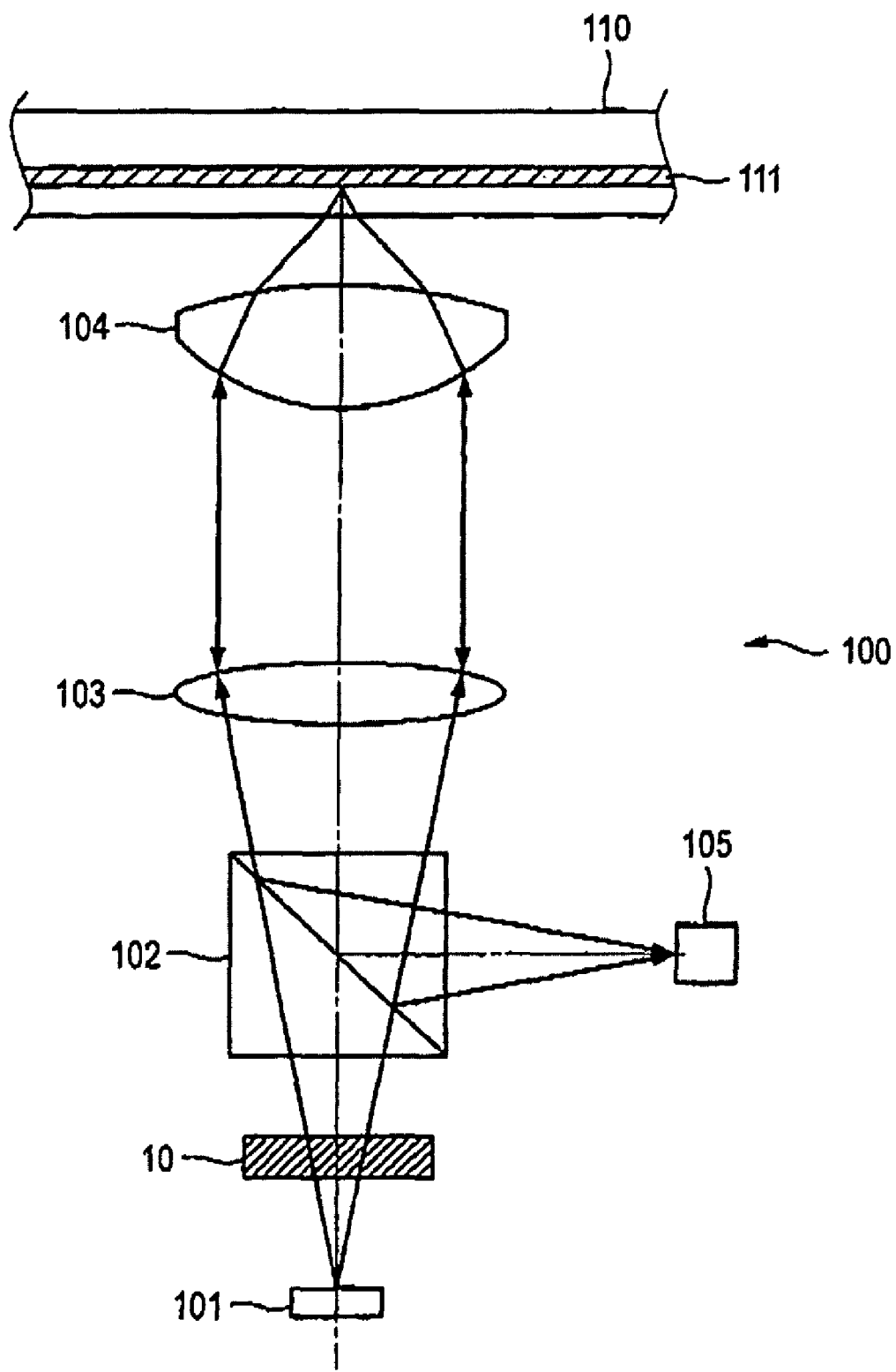
FIG. 4 is a conceptual view showing the structure of an optical head device according to the first embodiment of the present invention.

As shown in FIG. 4, the optical head device 100 comprises a light source 101 for emitting laser light, the wavelength-selective diffraction element 10, a beam splitter 102 for transmitting the laser light, a collimator lens 103 for converting the laser light to parallel light, an objective lens 104 for converging the parallel light on a recording layer 111 of an optical disc 110, and a photo detector 105 for detecting reflected light from the optical disc 110.

The light source 101 is provided with, for instance, a semiconductor laser diode to generate laser light of a wavelength applicable to the kind of the optical disc 110 and emit the laser light to the wavelength-selective diffraction element 10. The laser light generated in this embodiment are of the 405 nm band (the wavelength $\lambda_1$) and the 660 nm band (the wavelength $\lambda_2$). For instance, a plurality of light sources may be provided for emitting the laser light of different wavelengths to the wavelength-selective diffraction element 10.

The wavelength-selective diffraction element 10 outputs three beams including a transmitted light (the zero-order diffracted light) without diffracting the laser light of the wavelength $\lambda_1$ and light (the positive and/or negative first-order diffracted light) obtained by diffracting the laser light of the wavelength $\lambda_1$ to the beam splitter 102. Further, the wavelength-selective diffraction element 10 transmits the laser light of the wavelength $\lambda_2$ and outputs the laser light to the beam splitter 102.

The beam splitter 102 is formed with a transparent material, for instance, glass or plastic and is provided with a reflecting surface for reflecting the reflected light from the optical disc 110.

The collimator lens 103 is formed with a transparent material, for instance, glass or plastic or the like to convert the incident laser light to parallel light.

The objective lens 104 has a prescribed NA (numerical aperture) to converge the laser light traveled from the collimator lens 103 on the recording layer 111 of the optical disc 110 and capture the reflected light from the recording layer 111.

The photo detector 105 comprises, for instance, a lens or a diode or the like to convert the reflected light from the optical disc 110 that are reflected by the reflecting surface of the beam splitter 102 to an electric signal. Further, the photo detector 105 receives the reflected light of the three beams of the wavelength $\lambda_1$ and receives a main beam generated by the zero-order diffracted light and two auxiliary beams generated by the positive and/or negative first-order diffracted light to detect a tracking error signal in accordance with a light quantity difference between the two auxiliary beams and output the tracking error signal to a tracking controller (not shown).

Next, an operation of the optical head device 100 according to this embodiment will be described below. Firstly, a case that the optical disc 110 is the BD or the like will be described.

Initially, in the light of the wavelength $\lambda_1$ emitted from the light source 101, a part of the output light is diffracted by the wavelength-selective diffraction element 10. As a result, from the wavelength-selective diffraction element 10, the light including the zero-order diffracted light and the positive and/or negative first-order diffracted light is outputted, passes through the beam splitter 102 and is converted to the parallel light by the collimator lens 103. After that, in the parallel light outputted from the collimator lens 103, the zero-order diffracted light and the positive and/or negative first-order diffracted light are converged on an information recording track of the optical disc 110 in the form of the three beams by the objective lens 104.

The light reflected by the optical disc 110 passes through again the objective lens 104 and the collimator lens 103 and is reflected by the beam splitter 102 so that the main beam generated by the zero-order diffracted light and the two auxiliary beams generated by the positive and/or negative first-order diffracted light are converged on a light receiving face of the photo detector 105. Then, the tracking error signal is detected by the photo detector 105 on the basis of the light quantity difference between the two auxiliary beams and outputted to the tracking controller (not shown).

Accordingly, the optical head device 100 uses the photo detector 105 during reproducing operation of the BD or the like, so that the optical head device can detect a pit signal on an information recording surface of the optical disc and detect a focusing error signal to the information recording surface of the optical disc by an astigmatic method. Further, the optical head device 100 receives the positive and/or negative first-order diffracted light by the photo detector 105 so that the optical head device can detect the tracking error signal by the three-beam method.

Next, a case that the optical disc 110 is the DVD will be described below. Initially, the light of the wavelength $\lambda_2$ outputted from the light source 101 is not diffracted by the wavelength-selective diffraction element 10 and is transmitted straightforward, further passes through the beam splitter 102 and is converted to the parallel light by the collimator lens 103.

Then, the parallel light are converged on the information recording track of the optical disc 110 by the objective lens 104. Then, the light reflected by the optical disc 110 pass through again the objective lens 104 and the collimator lens 103 and are reflected by the beam splitter 102 and converged on a light receiving face of the photo detector 105.

In the optical head device 100 on which the wavelength-selective diffraction element 10 of the present invention is mounted, since the light of the wavelength $\lambda_2$ is not diffracted by the wavelength-selective diffraction element 10 and is transmitted straightforward, an efficiency of light is not lowered and a stray light is not generated. Accordingly, when the reproducing operation of the DVD is performed, the optical head device separately detects the tracking error signal by a one-beam push-pull method and can detect the focusing error signal and the pit signal as recording information on the surface of the optical disc by the astigmatic method in a stable way.

In the above-description, an example is explained that the wavelength-selective diffraction element 10 is applied to the three-beam method relative to the light of the wavelength of $\lambda_1$ for the BD or the like, however, the present invention is not limited thereto and may be applied to, for instance, a hologram diffraction grating for detecting a focusing signal.

As described above, according to the wavelength-selective diffraction element 10 of this embodiment, the concavo-convex part 13 and the filling part 14 respectively include the optically isotropic materials that respectively have light absorbing wavelength ranges for absorbing the light of prescribed wavelengths in wavelength ranges different from the wavelength ranges of incident light of different wavelengths $\lambda_1$, $\lambda_2$ and $\lambda_3$. The concavo-convex part 13 and the filling part 14 respectively have the different refractive indices to the light of the wavelength $\lambda_1$ and the same refractive index to the light of the wavelengths $\lambda_2$ and $\lambda_3$. Accordingly, the light of different wavelengths can be selectively diffracted so that the light in a wavelength range wider than that of the conventional wavelength-selective diffraction element in which light of a specific wavelength range is absorbed can be selectively diffracted.

Since the optical head device 100 according to this embodiment comprises the wavelength-selective diffraction element 10 that can selectively diffract the light of the different three wavelength bands, information recorded on the BD or the like, the DVD and the CD can be more precisely read out.

In the above-described embodiment, it is exemplified and described that the wavelength-selective diffraction element 10 selectively diffracts the light of the three wavelengths $\lambda_1$, $\lambda_2$ and $\lambda_3$ used for reading and writing data on the BD or the like, the DVD and the CDT however, the present invention is not limited thereto. When the wavelength-selective diffraction element has a structure that selectively diffracts a plurality of different wavelengths, the same effects can be obtained.

In the above-described embodiment, the refractive index of the concavo-convex part 13 in the wavelength 405 nm band is larger than the refractive index of the filling part 14 (see FIG. 2), however, the concavo-convex part 13 and the filling part 14 may be formed so that the above relationship is reversed.

In the above-described embodiment, it is exemplified and described that the wavelength-selective diffraction element 10 of the optical head device 100 uses the three-beam method in the tracking control at the time of reading the information recorded on the BD or the like, however, the present invention is not limited to such a diffraction element. The present invention may be applied to a hologram diffraction element that converges or diffuses light by, for instance, a curved pattern, an aberration correcting element having a concentric diffraction pattern or a wavelength selecting lens element. The diffraction pattern may be employed at a part of an effective area as an area through which a light passes, and may be applied to, for instance, an aperture restricting element disposed only in an outer periphery. These elements are installed and used between, for instance, an objective lens and a collimator lens. However, an installed place is not limited thereto.

In the above-described embodiment, it is exemplified and described that the wavelength-selective diffraction element 10 is provided between the light source 101 and the beam splitter 102 of the optical head device 100, however, the present invention is not limited thereto. A structure may be employed that the wavelength-selective diffraction element 10 is provided in an optical path between the light source 101 and the objective lens 104 of the optical head device 100.

Second Embodiment

Initially, the structure of a wavelength-selective diffraction element according to a second embodiment of the present invention will be described. It is exemplified that the wavelength-selective diffraction element of this embodiment is applied to the standards of a BD or the like, a DVD and a CD like the wavelength-selective diffraction element 10 according to the first embodiment of the present invention (see FIG. 1) and duplicated explanations will be omitted.

Figure 5:
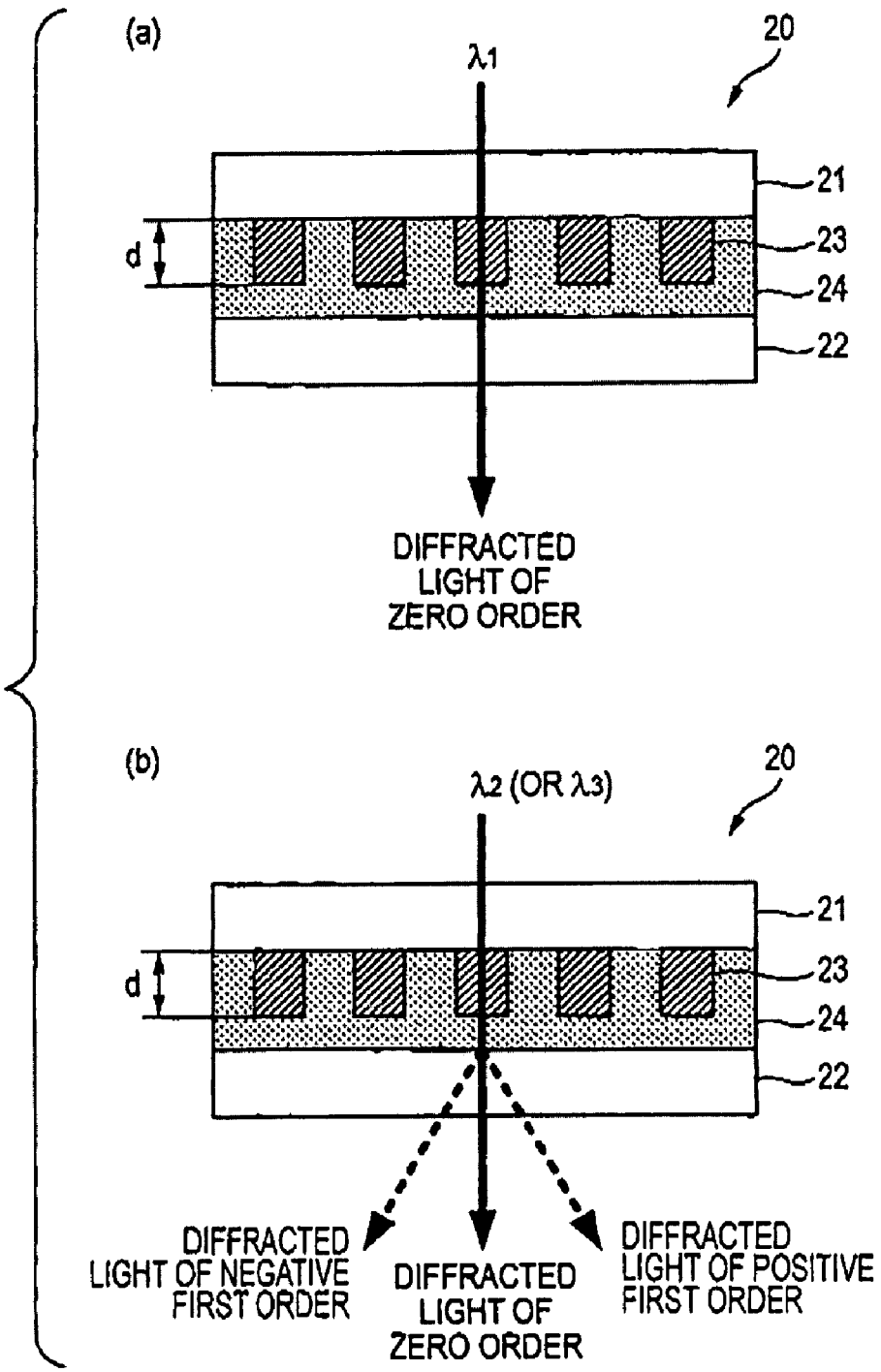
In FIG. 5, (a) is a conceptual view showing a state that incident light of a wavelength $\lambda_1$ is transmitted by a wavelength-selective diffraction element according to a second embodiment of the present invention, and (b) is a conceptual view showing a state that incident light of a wavelength $\lambda_2$ or $\lambda_3$ is diffracted by the wavelength-selective diffraction element according to the second embodiment of the present invention.

As shown in FIG. 5, the wavelength-selective diffraction element 20 according to this embodiment comprises a pair of transparent substrates 21 and 22, a concavo-convex part 23 formed on the transparent substrate 21 in which concave portions and convex portions are cyclically extended in one direction, and a filling part 24 provided so as to fill at least the concave portions of the concavo-convex part 23.

In FIG. 5, (a) shows a state that the light of a wavelength $\lambda_1$ is incident on and transmitted by the wavelength-selective diffraction element 20. Further, (b) shows a state that the light of a wavelength $\lambda_2$ or $\lambda_3$ is incident on and diffracted by the wavelength-selective diffraction element 20. Though not shown in (b) of FIG. 5, an angle at which the positive and/or negative first-order diffracted light of the wavelength $\lambda_2$ is diffracted is precisely different from an angle at which the positive and/or negative first-order diffracted light of the wavelength $\lambda_3$ is diffracted.

Further, in the wavelength-selective diffraction element 20 according to this embodiment, the structures of the concavo-convex part 23 and the filling part 24 are different from those of the wavelength-selective diffraction element 10 according to the first embodiment of the present invention. Accordingly, the structures of the concavo-convex part 23 and the filling part 24 will be described below and an explanation of other structures will be omitted.

Figure 6:
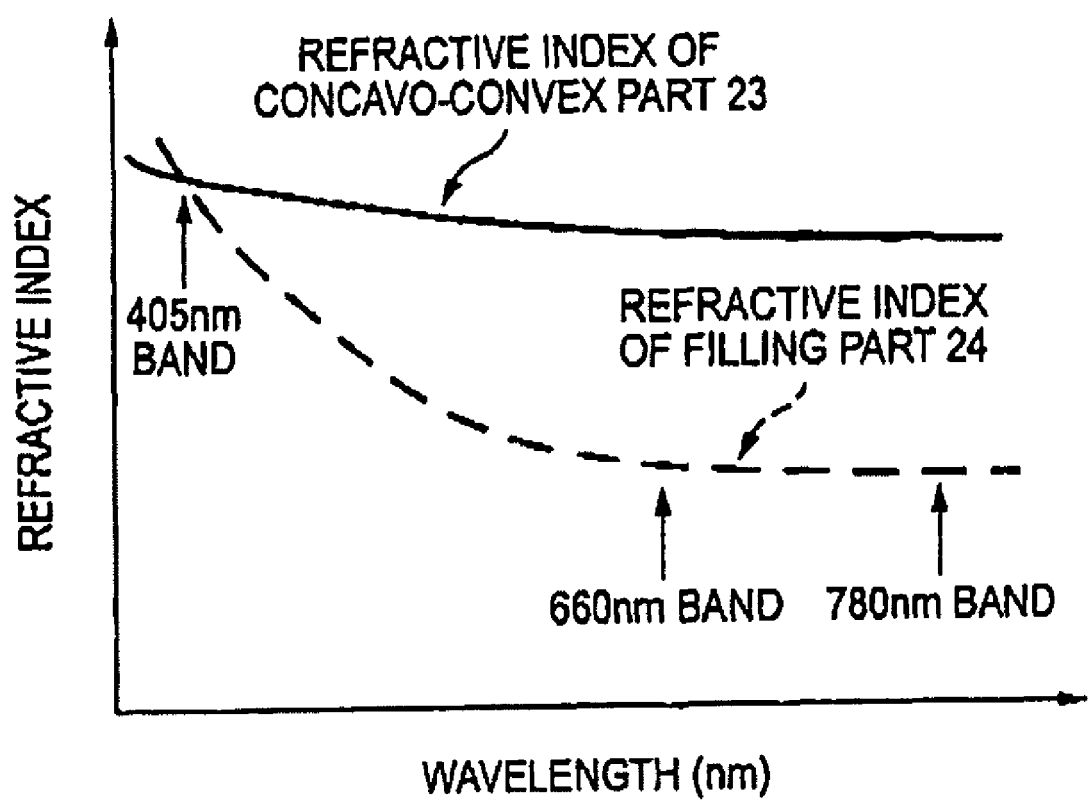
FIG. 6 is a diagram showing a relation between the wavelength and the refractive index of light incident on a concavo-convex part and a filling part in the wavelength-selective diffraction element according to the second embodiment of the present invention.

Further, as shown in FIG. 6, the concavo-convex part 23 and the filling part 24 are made of a material having the same refractive index relative to incident light of a wavelength 405 nm band and different refractive indices relative to incident light of a wavelength 660 nm band and a 780 nm band. Accordingly, the wavelength-selective diffraction element 20 according to this embodiment can transmit the incident light of the wavelength 405 nm band and diffract the incident light of the wavelength 660 nm band and the 780 nm band.

The above-described "same refractive index" is not limited only to the completely coincident refractive index and may be a value considered to be substantially the same in use. Further, in FIG. 6, the refractive indices of the concavo-convex part 23 in the 660 nm band and the 780 nm band are larger than the refractive index of the filling part 24, however, this relationship may be reversed.

Next, a specific example of the wavelength-selective diffraction element 20 according to this embodiment will be described below.

Materials or producing methods or the like described later are mere examples and the present invention is not limited thereto.

Example 2

Initially, on the transparent substrate 21 made of a glass substrate, a film of a first photo-polymerizing polymer is formed under a state of a monomer by a spin coat method. Then, the formed monomer is polymerized by applying a ultraviolet ray to have a photo-polymer and a polymer film having the thickness of 18.5 μm is formed. Further, the polymer film is formed in the configuration of a grating having a pitch of 12 μm by a dry etching method to obtain the concavo-convex part 23.

Subsequently, the grating-shaped concavo-convex part 23 are filled with a second photo-polymerizing polymer under the state of a monomer, and then, the transparent substrate 22 made of the glass substrate is laminated thereon. Then, the filled monomer is polymerized by applying the ultraviolet ray to obtain the wavelength-selective diffraction element 20.

The above-described first and second photo-polymerizing polymers are any of polymer materials such as a polyester material, a polyether material, an acrylic material, an epoxy material, etc. or can be obtained by mixing a plurality of the polymer materials. Here, the concavo-convex part 23 and the filling part 24 are produced by using any of the monomers or a material obtained by mixing together a plurality of homogeneous materials or heterogeneous materials so that the refractive indices of the concavo-convex part 23 and the filling part 24 correspond to each other in the wavelength 405 nm band and do not correspond to each other in the wavelength 660 nm band and the 780 nm band as shown in FIG. 6 thereby transmitting the light of the wavelength 405 nm band and diffracting the light of the wavelength 660 nm band and the 780 nm band, and further, such polymerization characteristics can be assured as to ensure reliability such as a light resistance, a durability or the like.

Figure 7:
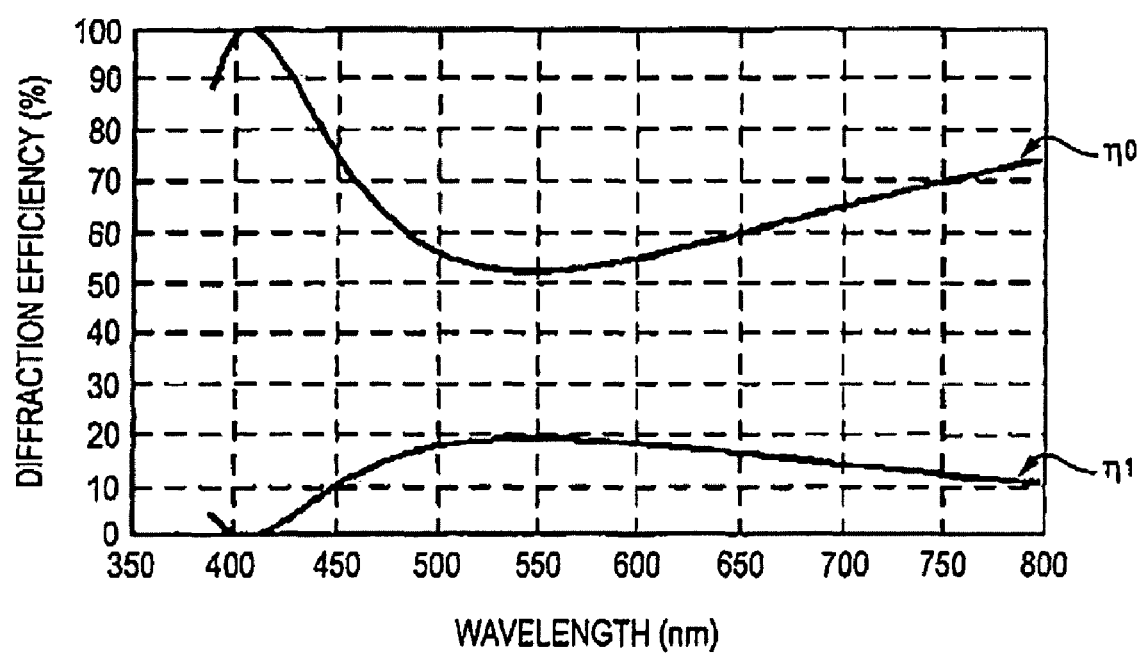
FIG. 7 is a diagram showing a computer simulation result of a diffraction efficiency of the wavelength-selective diffraction element according to the second embodiment of the present invention.

When the transmittance of the wavelength-selective diffraction element 20 manufactured under the above-described conditions was calculated by a computer simulation, such a result as shown in FIG. 7 was obtained. In this figure, a curve shown by $\eta_0$ designates data of a diffraction efficiency of the zero-order diffracted light, that is, designates data of a transmittance of incident light. A curve shown by $\eta_1$ designates data of a diffraction efficiency of the first-order diffracted light. As a result, the wavelength-selective diffraction element 20 according to this embodiment can transmit the light of the wavelength 405 nm band and diffract the light of the wavelength 660 nm band and the 780 nm band.

The wavelength-selective diffraction element 20 according to this embodiment can be mounted on an optical head device that reads information recorded on the BD or the like and the CD. In this case, when the wavelength-selective diffraction element 20 is applied as a three-beam generating diffraction grating, the optical head device can carry out a tracking control by using a three-beam method when the optical head device reads the information recorded on the CD. Since the structure of the optical head device in this case is the same as that of the optical head device 100 according to the first embodiment of the present invention (see FIG. 4) and wavelengths for obtaining three beams are merely different, a detailed explanation will be omitted.

As described above, according to the wavelength-selective diffraction element 20 of this embodiment, the concavo-convex part 23 and the filling part 24 respectively include optically isotropic materials that respectively have light absorbing wavelength ranges for absorbing the light of prescribed wavelengths in wavelength ranges different from the wavelength ranges of incident light of different wavelengths $\lambda_1$, $\lambda_2$ and $\lambda_3$. The concavo-convex part 23 and the filling part 24 respectively have the same refractive index to the light of the wavelength $\lambda_1$ and the different refractive indices to the light of the wavelengths $\lambda_2$ and $\lambda_3$. Accordingly, the light of different wavelengths can be selectively diffracted so that the light in a wavelength range wider than that of a conventional wavelength-selective diffraction element employed for the light of two wavelengths can be selectively diffracted.

In the above-described embodiment, it is exemplified and described that the wavelength-selective diffraction element 20 selectively diffracts the light of the three wavelengths $\lambda_1$, $\lambda_2$ and $\lambda_3$ used for reading and writing data on the BD or the like, the DVD and the CD, however, the present invention is not limited thereto. When the wavelength-selective diffraction element has a structure that selectively diffracts a plurality of different wavelengths, the same effects can be obtained.

Third Embodiment

The structure of a wavelength-selective diffraction element according to a third embodiment of the present invention will be described. It is exemplified that the wavelength-selective diffraction element of this embodiment is applied to the standards of a BD or the like, a DVD and a CD like the wavelength-selective diffraction element 10 according to the first embodiment of the present invention (see FIG. 1) and duplicated explanations will be omitted.

Figure 8:
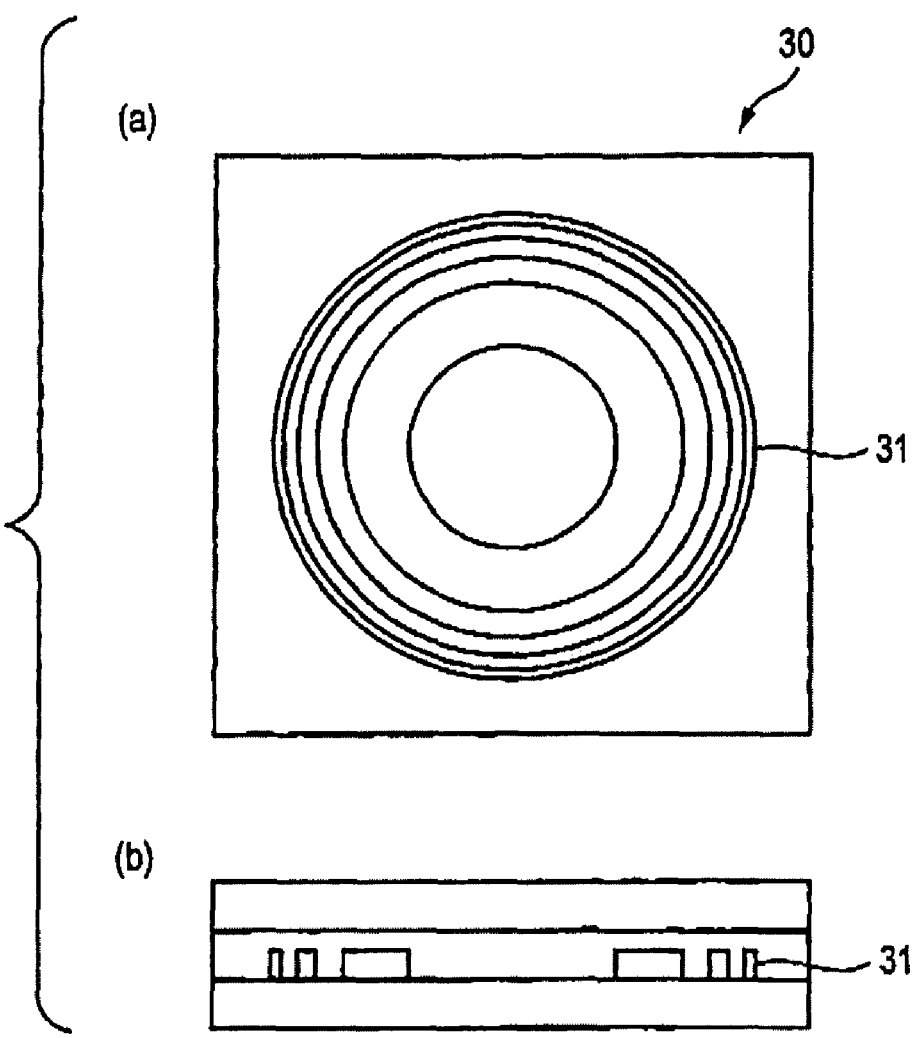
In FIG. 8, (a) is a plan view showing the structure of a wavelength-selective diffraction element according to a third embodiment of the present invention, and (b) is a section view showing the structure of the wavelength-selective diffraction element of the third embodiment of the present invention.

The wavelength-selective diffraction element 30 according to this embodiment has a structure the same as that of the wavelength-selective diffraction element 10 according to the first embodiment of the present invention whose structure is shown in the conceptual view of FIG. 1 except that a refractive index difference Δn between first and second photopolymerizing polymers in a wavelength 405 nm and the height of a grating are adjusted so that zero-order diffracted light is made minimum and positive and/or negative first-order diffraction efficiencies are made maximum relative to incident light of a wavelength 405 nm band (a wavelength $\lambda_1$) and that a grating pattern 31 is provided as shown in a plan view and a section view in FIG. 8 in which a cycle of concavo-convex part of a concentric circular diffraction grating is made to be smaller as coming closer to an outer peripheral part, within an effective area on which the light is incident. That is, in the wavelength-selective diffraction element 30 according to this embodiment, for instance, the refractive index difference Δn relative to the light of the wavelength 405 nm band is set to 0.008 and the thickness of the concavo-convex parts is set to 25 μm.

Figure 9:
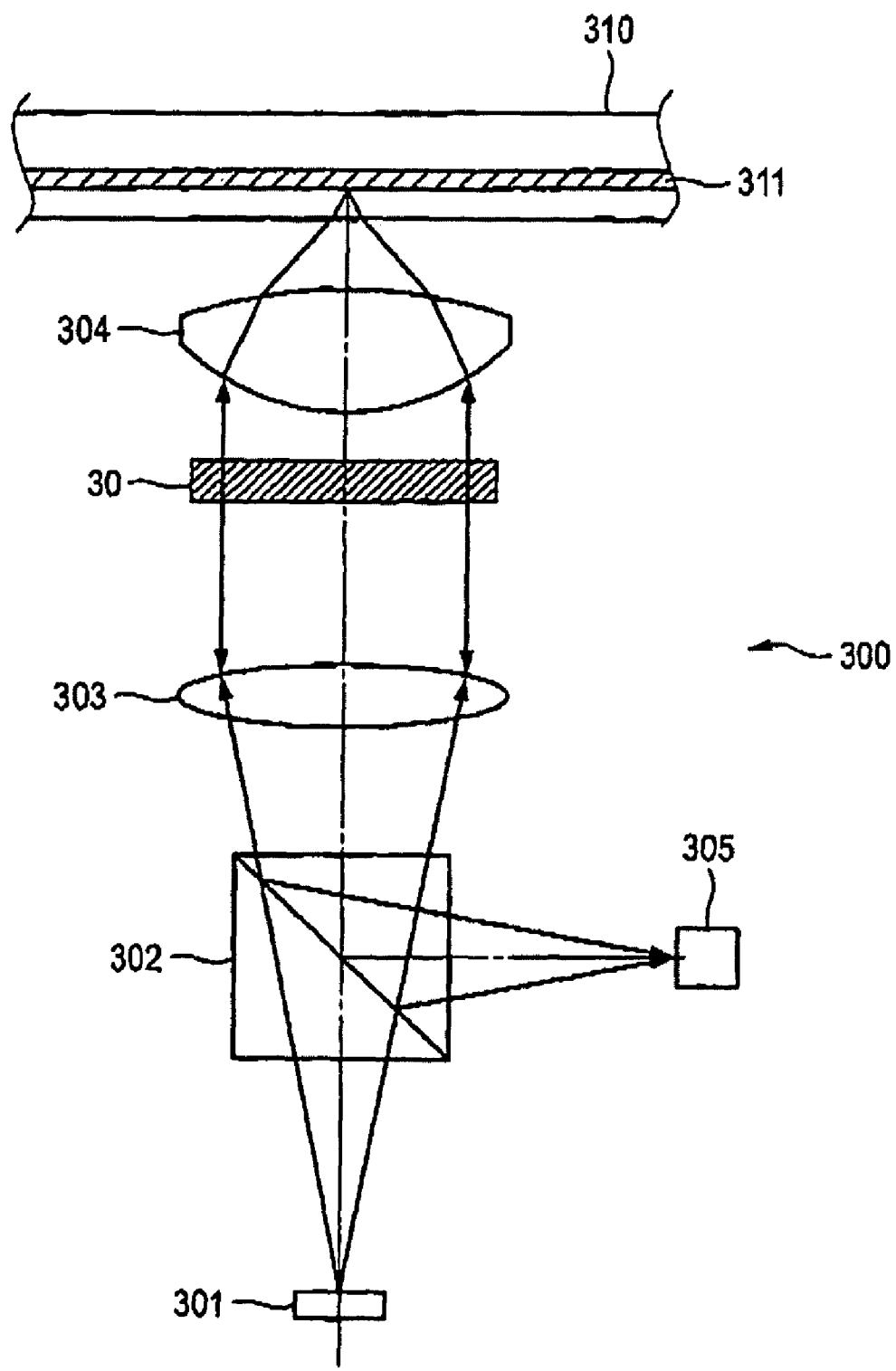
FIG. 9 is a conceptual diagram showing the structure of an optical head device according to the third embodiment of the present invention.

Next, an optical head device on which the wavelength-selective diffraction element 30 according to this embodiment is mounted will be described below. As shown in FIG. 9, the optical head device 300 according to this embodiment includes a light source 301 for emitting laser light, a beam splitter 302 for transmitting the laser light, a collimator lens 303 for converting the laser light to parallel light, the wavelength-selective diffraction element 30, an objective lens 304 for converging the parallel light on a recording layer 311 of an optical disc 310, and a photo detector 305 for detecting reflected light from the optical disc 310. Namely, the optical head device 300 according to this embodiment has the same structure as that of the optical head device 100 of the first embodiment (see FIG. 4) except that the above-described wavelength-selective diffraction element 30 is used in place of the wavelength-selective diffraction element 10 of the first embodiment and that the wavelength-selective diffraction element is arranged between the collimator lens 303 and the objective lens 304 in an optical path of a forward passage.

The light source 301 is formed with, for instance, a semiconductor laser diode to generate the laser light of a wavelength applicable to the kind of the optical disc 310. The laser light generated in this embodiment represents laser light of a wavelength 405 nm band (the wavelength $\lambda_1$), a 660 nm band (a wavelength $\lambda_2$) and a 780 nm band (a wavelength $\lambda_3$). There may be provided a configuration in which laser light of different wavelengths are respectively emitted from a plurality of light sources and mixed later.

Since the optical discs 310 have different thickness of the cover layer of the recording layer 311 or recording size depending on the kinds thereof, light converging methods respectively suitable for the optical discs need to be used. When the same objective lens 304 is used to read and write data on the different kinds of the optical discs 310, it is preferable that a correction is performed.

Figure 10:
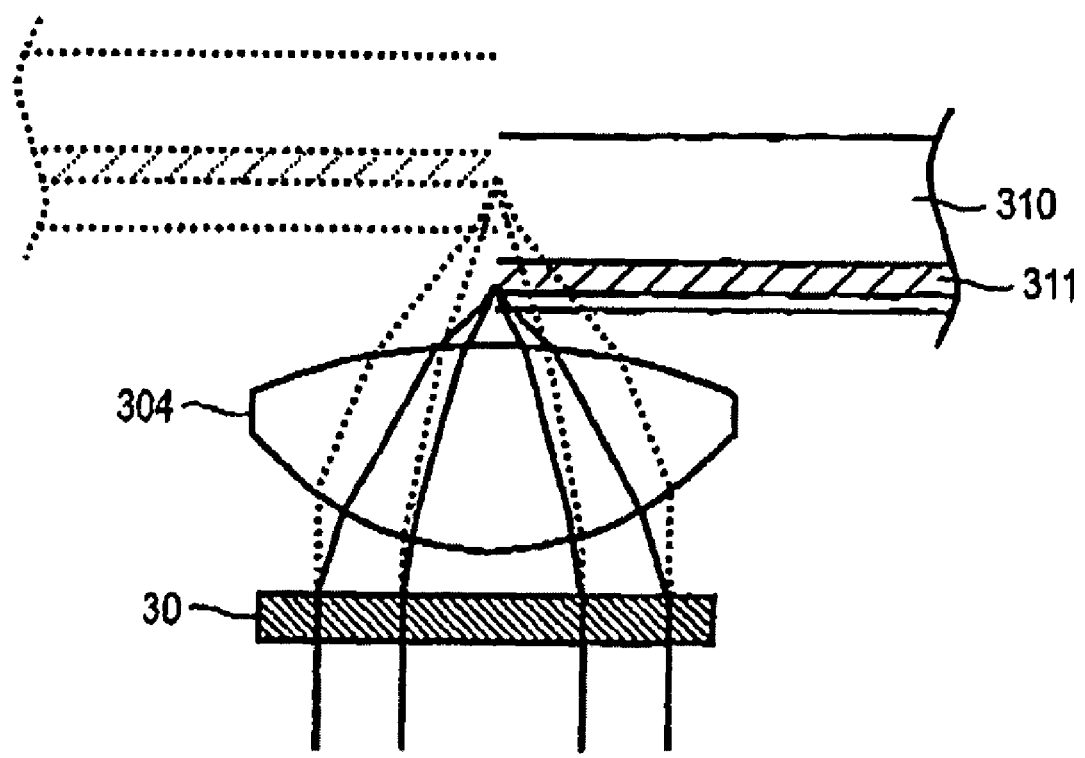
FIG. 10 is a conceptual view showing a state that incident light of a wavelength $\lambda_1$ is diffracted and incident light of wavelength $\lambda_2$ and $\lambda_3$ are transmitted by the wavelength-selective diffraction element according to the third embodiment of the present invention.

Next, the light converging characteristics of the optical head device 300 using the wavelength-selective diffraction element 30 according to this embodiment is schematically shown in FIG. 10. Since the wavelength-selective diffraction element 30 diffracts substantially all the incident light of the wavelength 405 nm band (the wavelength $\lambda_1$) and comprises the concentric circular grating pattern 31 whose cycles of the grating are not constant as described above, the light incident on a central part substantially straightforward and, as the light comes closer to the outer peripheral part, the light is diffracted at a larger diffraction angle. Accordingly, the incident light are converged on the wavelength-selective diffraction element 30 and the objective lens 304 as shown by solid lines in FIG. 10 and converged in a position near the objective lens 304 with a large NA (numerical aperture). On the other hand, since the wavelength-selective diffraction element 30 according to this embodiment does not diffract the incident light of the wavelength 660 nm band (the wavelength $\lambda_2$) and the 780 nm band (the wavelength $\lambda_3$), the incident light passing through the wavelength-selective diffraction element 30 and the objective lens 304 are converged only by the objective lens 304 as shown by dashed lines in FIG. 10 and converged at a position remoter than the incident light of the wavelength 405 nm band with a small NA (numerical aperture).

As described above, when the wavelength-selective diffraction element 30 that diffracts only the wavelength 405 nm band (the wavelength $\lambda_1$) and does not diffract the wavelength 660 nm band (the wavelength $\lambda_2$) and the 780 nm band (the wavelength $\lambda_3$) is used, the reading and writing operations can be compatibly performed with respect to optical discs designed for the wavelength 405 nm band (the wavelength $\lambda_1$), the wavelength 660 nm band (the wavelength $\lambda_2$) and the 780 nm band (the wavelength $\lambda_3$) even if the objective lens 304 is so optimized as to converge the light of the wavelength 660 nm band (the wavelength $\lambda_2$) and the 780 nm band (the wavelength $\lambda_3$).

The present invention is not limited to the above-described structure, and the wavelength-selective diffraction element that does not diffract the wavelength 405 nm band (the wavelength $\lambda_1$) and diffracts the wavelength 660 nm band (the wavelength $\lambda_2$) and the 780 nm band (the wavelength $\lambda_3$) may be used with the objective lens optimized to the wavelength 405 nm band (the wavelength $\lambda_1$), a compatible reading and writing can be likewise carried out.

Further, the grating pattern 31 is not limited to the pattern shown in FIG. 8, the grating pattern may have a proper distribution of cycles of a grating in order to improve the light converging characteristics under the operating wavelength and may be an elliptic form. Further, the sectional form of the cyclic concavo-convex part may have a rectangular shape shown in FIG. 1 by which the intensity of positive and/or negative first-order diffracted light is substantially equally diffracted, or a serrate shape or an approximated serrate shape to improve one diffraction efficiency and enhance the available light yield or reduce the influence of unnecessary light.

As described above, the optical head device 300 according to this embodiment can read and write data on different kinds of optical discs by the same objective lens 304 and can effectively simplify an optical system, and is advantageously used as the wavelength-selective diffraction element and the optical head device that selectively diffract the light of a plurality of different wavelengths.

Fourth Embodiment

The structure of a wavelength-selective diffraction element according to a fourth embodiment of the present invention will be described. It is exemplified that the wavelength-selective diffraction element of this embodiment is applied to the standards of a BD or the like, a DVD and a CD like the wavelength-selective diffraction element 10 according to the first embodiment of the present invention (see FIG. 1) and duplicated explanations will be omitted.

Figure 11:
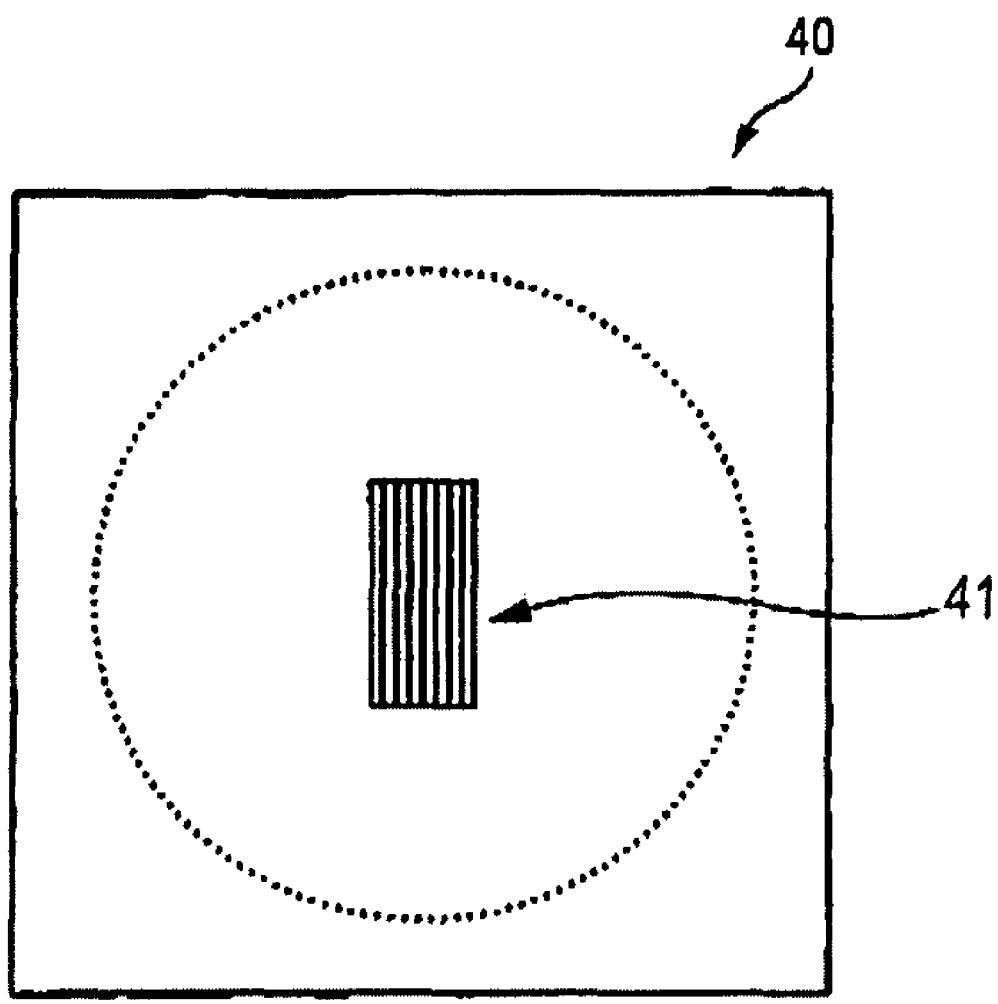
FIG. 11 is a schematic plan view of a wavelength-selective diffraction element according to a fourth embodiment of the present invention.

The wavelength-selective diffraction element 40 according to this embodiment has a structure the same as that of the wavelength-selective diffraction element 10 according to the first embodiment (see FIG. 1) except that the height of a grating is adjusted so that zero-order diffracted light is made minimum and positive and/or negative first-order diffraction efficiencies are made maximum relative to light of a wavelength 405 nm band (a wavelength $\lambda_1$) and that, as shown in a schematic plan view of FIG. 11, a diffraction grating including concavo-convex parts and a filling part is formed only in a central rectangular grating area 41 in an effective area on which the light is incident. That is, in the wavelength-selective diffraction element 40 according to this embodiment, for instance, a refractive index difference Δn relative to the light of the wavelength 405 nm band is set to 0.008 and the thickness of the concavo-convex parts is set to 25 μm.

Figure 12:
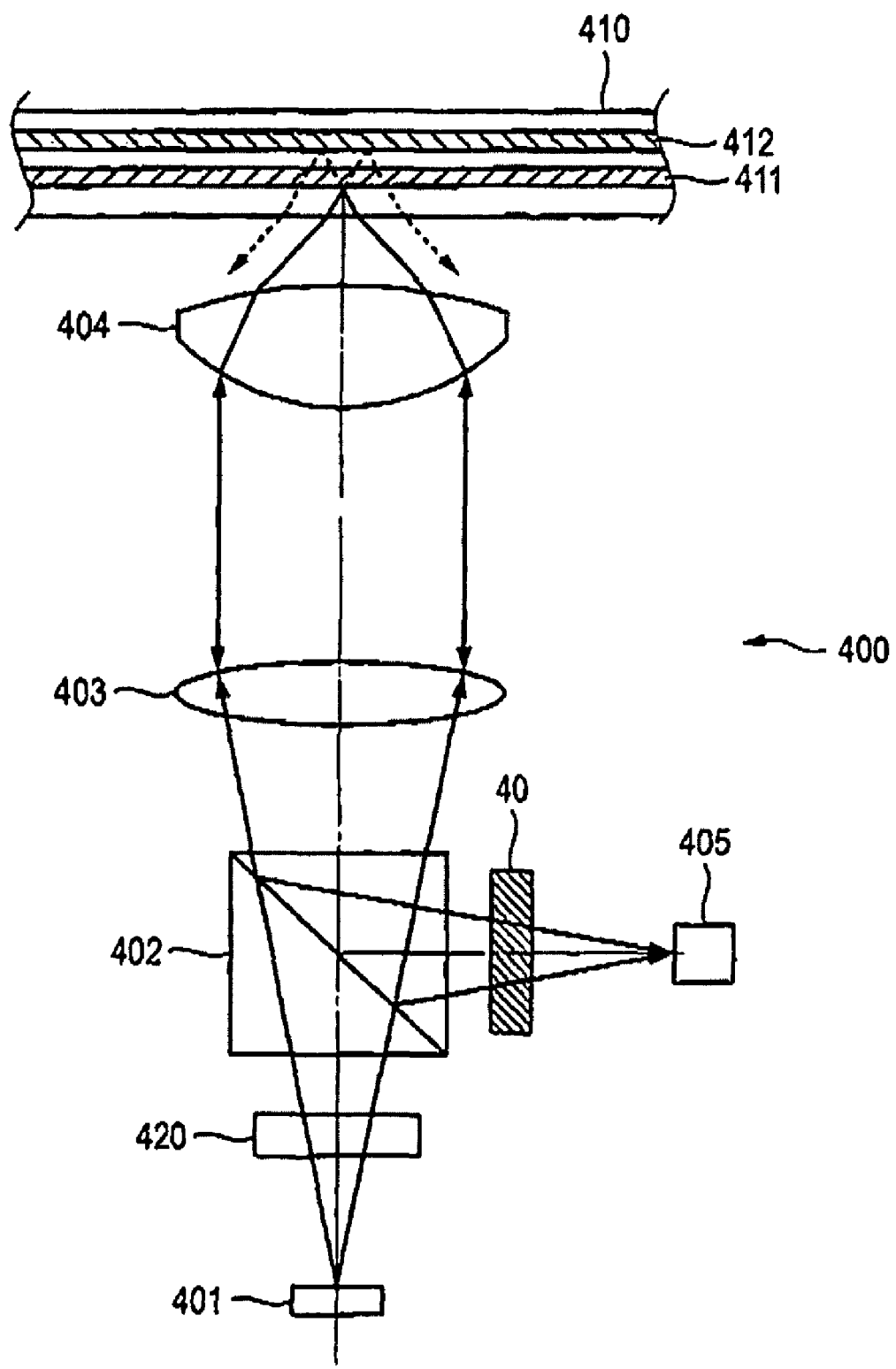
FIG. 12 is a conceptual view showing the structure of an optical head device according to the fourth embodiment of the present invention.

Next, an optical head device on which the wavelength-selective diffraction element 40 according to this embodiment is mounted will be described below. As shown in FIG. 12, the optical head device 400 according to this embodiment comprises a light source 401 for emitting laser light, a diffraction element 420 for generating three beams, a beam splitter 402 for transmitting the laser light, a collimator lens 403 for converting the laser light to parallel light, an objective lens 404 for converging the parallel light on a first recording layer 411 and a second recording layer 412 of an optical disc 410 and a photo detector 405 for detecting reflected light from the optical disc 410. Further, the above-described wavelength-selective diffraction element 40 is arranged and provided between the beam splitter 402 and the photo detector 405 in an optical path of a return passage.

The light source 401 is provided with, for instance, a semiconductor laser diode to generate the laser light of a wavelength applicable to the kind of the optical disc 410. The laser light generated in this embodiment represents laser light of the wavelength 405 nm band (the wavelength $\lambda_1$), a 660 nm band (a wavelength $\lambda_2$) and a 780 nm band (a wavelength $\lambda_3$). For instance, a structure may be used in which a plurality of light sources are provided for emitting the laser light of different wavelengths.

The diffraction element 420 generates the three beams including transmitted zero-order diffracted light (a main beam) that is not diffracted and positive and/or negative first-order diffracted light (auxiliary beams) from the laser light of the wavelength 405 nm band emitted from the light source 401 and outputs the beams to the beam splitter 402.

The optical disc 410 includes the two recording layers, that is, the first recording layer 411 and the second recording layer 412. As shown in FIG. 12, when the objective lens 404 is arranged so as to converge the light on the first recording layer 411, the laser light of the 405 nm band applied to the optical disc 410 is reflected from the first recording layer 411 as main reflected light, and also incident on the second recording layer 412 so as to form a spread spot as indicated by dashed lines to generate reflected light thereby. After these reflected light pass through the objective lens 404, the collimator lens 403, the beam splitter 402 and the wavelength-selective diffraction element 40, the reflected light are incident on the photo detector 405.

Figure 13:
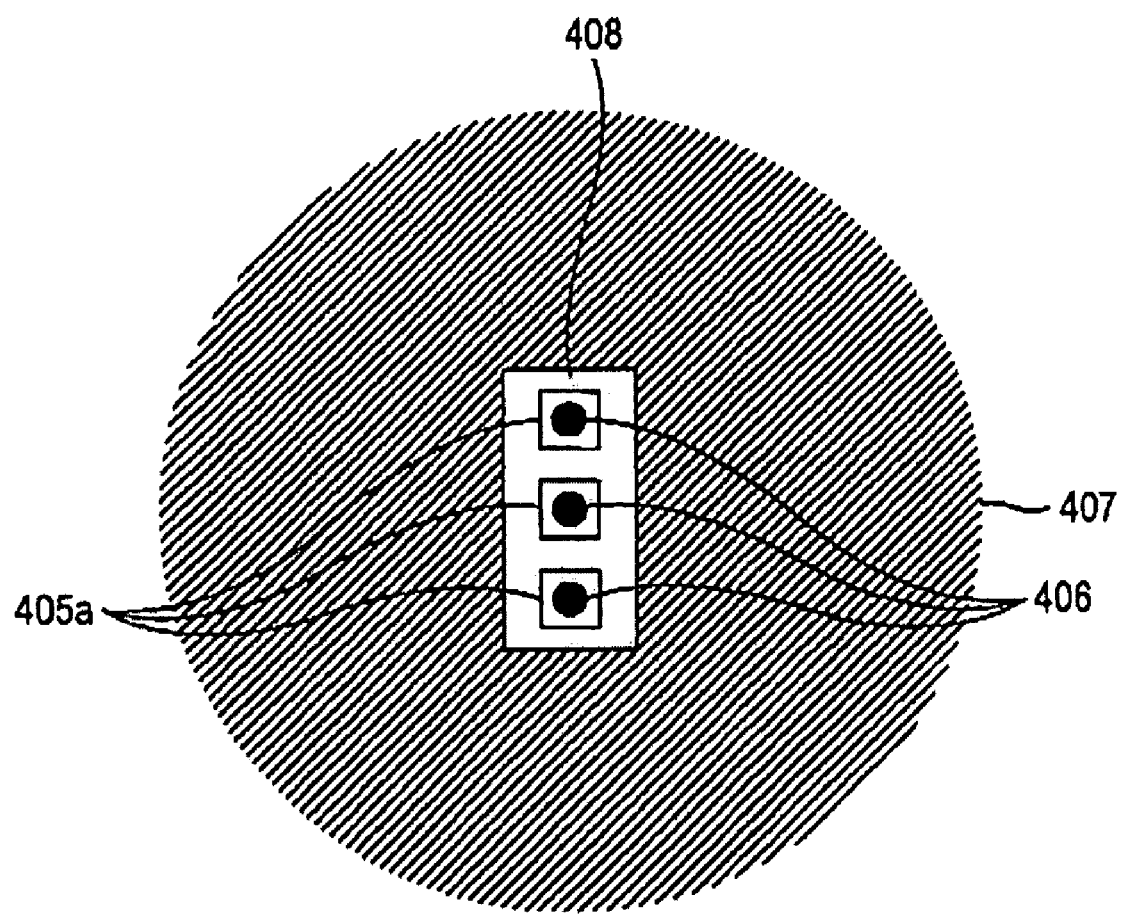
FIG. 13 is a conceptual view of a spot shape on a photo detector formed by the wavelength-selective diffraction element according to the fourth embodiment of the present invention.

The photo detector 405 is formed so as to receive the reflected light of the three beams similarly to the optical head device 100 shown in FIG. 4. Referring to FIG. 13, a state of the reflected light from the two recording layers is explained that are incident on the photo detector 405 when the first recording layer 411 of the optical disc having the two recording layers is read by using the light of the wavelength 405 nm. FIG. 13 is a diagram schematically showing the intensity of the reflected light on the photo detector 405. The light of the wavelength 405 nm band (the wavelength $\lambda_1$) converged on the first recording layer 411 are converged as a spot 406 in a light receiving part 405a of the photo detector 405, and a signal and a tracking error signal recorded on the first recording layer 411 are detected. As compared therewith, the reflected light from the spread spot on the second recording layer 412 are incident on the photo detector 405 in a spot 407 shown as a hatched area. Here, substantially all of the light of the wavelength 405 nm band (the wavelength $\lambda_1$) are diffracted and made to deviate from an optical path by the grating pattern formed at the central rectangular grating area 41 in the effective area of the wavelength-selective diffraction element 40. Thus, in the center of the spread spot 407, a light shielding part 408 is formed on which the reflected light are not incident. Thus, a reflection noise (interlayer crosstalk) by the reflected light from the recording layer that are not converged is reduced to realize good reading and writing characteristics. On the other hand, since the wavelength-selective diffraction element 40 almost completely transmits the light of the 660 nm band (a wavelength $\lambda_2$) and the 780 nm band (a wavelength $\lambda_3$), when reading and writing operations using these wavelengths are performed, all the light within the effective area can be efficiently utilized without a loss.

In this embodiment, it is exemplified that the light is converged on the first recording layer 411 is described, however, when the light is converged on the second recording layer 412, the completely same effects can be likewise obtained for reflected light from the first recording layer 411. Further, the shape of the grating area 41 shown in this embodiment is not limited to that shown in FIG. 11. The shape of the grating area or the number of the grating areas may be optimally designed depending on the shape of the light receiving part of a photo detector to be used or the level of an influence of the reflection noise, so that the loss can be reduced. Further, the wavelength diffracted by the wavelength-selective diffraction element is not limited to the wavelength 405 nm band (the wavelength $\lambda_1$) and a structure may be employed that other wavelength bands are diffracted. Further, a plurality of wavelength-selective diffraction elements having different wavelengths to be diffracted may be used so that the reflection noise can be freely shielded relative to all light receiving parts or specific light receiving parts. At this time, an area where the diffraction grating is formed is set to an entire area of the effective area or a part thereof. Further, the area where the diffraction grating is formed is preferably designed such that a utilization efficiency can be maximized by considering methods for processing a signal respectively to the wavelengths or a degree of influence of the reflection noise.

As described above, since the optical head device 400 according to the present invention has an advantage that the interlayer crosstalk of the optical disc having a plurality of recording layers can be reduced and the utilization efficiency under the different wavelengths can be enhanced, it is advantageously used as the wavelength-selective diffraction element and the optical head device that selectively diffract light of different wavelengths.

Fifth Embodiment

The structure of a wavelength-selective diffraction element according to a fifth embodiment of the present invention will be described. It is exemplified that the wavelength-selective diffraction element of this embodiment is applied to the standards of a BD or the like, a DVD and a CD like the wavelength-selective diffraction element 10 according to the first embodiment of the present invention (see FIG. 1) and duplicated explanations will be omitted.

Figure 14:
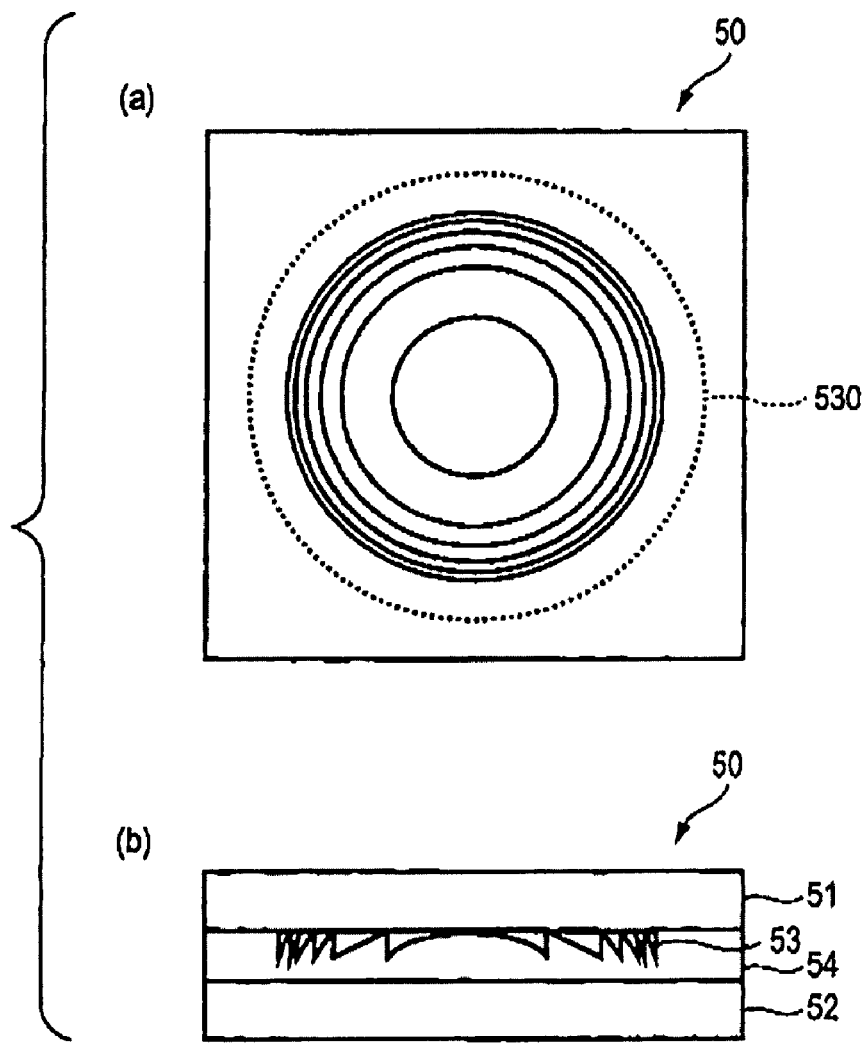
In FIG. 14, (a) is a plan view showing the structure of a wavelength-selective diffraction element according to a fifth embodiment of the present invention, and (b) is a section view showing the structure of the wavelength-selective diffraction element of the fifth embodiment of the present invention.

A conceptual view of a plane structure of the wavelength-selective diffraction element 50 according to this embodiment is shown in (a) of FIG. 14 and a conceptual view of a sectional structure is shown in (b) of FIG. 14. The wavelength-selective diffraction element 50 according to this embodiment has a structure the same as that of the wavelength-selective diffraction element 10 according to the first embodiment except that a concentric circular grating pattern is provided in which a cycle of concavo-convex part of a concentric circular diffraction grating is made to be smaller as coming closer to an outer peripheral part, and that the height of a diffraction grating is adjusted so as to transmit a part of incident light of a 405 nm band (a wavelength $\lambda_1$) straightforward and diffract the remaining part thereof.

In accordance with this structure, the wavelength-selective diffraction element 50 according to this embodiment does not serve as a diffraction grating relative to the incident light of a wavelength 660 nm band (a wavelength $\lambda_2$) and a 780 nm band (a wavelength $\lambda_3$) to transmit the incident light straightforward, but to transmit a part of the incident light of the wavelength 405 nm band (the wavelength $\lambda_1$) straightforward and diffract the remaining part thereof to be converged and/or diffused. Here, the height of the diffraction grating is preferably adjusted so that the intensity of zero-order diffracted light, that is, the straightforward transmitted light relative to the incident light of the wavelength 405 nm band (the wavelength $\lambda_1$) is made substantially equal to the intensities of the diffracted light of positive first-order diffracted light and negative diffracted light, that is, one of the converged light and the diffused light to be used.

As the sectional form of the grating, any of a rectangular form, a serrate form or a form in which a certain serrate form is approximated by stepwise contours may be employed. These forms are preferably used to improve a diffraction efficiency in a desired direction to be used.

Next, it is exemplified and explained that the wavelength-selective diffraction element 50 according to this embodiment is mounted on an optical head device 500 and the optical head device 500 reads information recorded on the BD or the like, the DVD and the CD.

Figure 15:
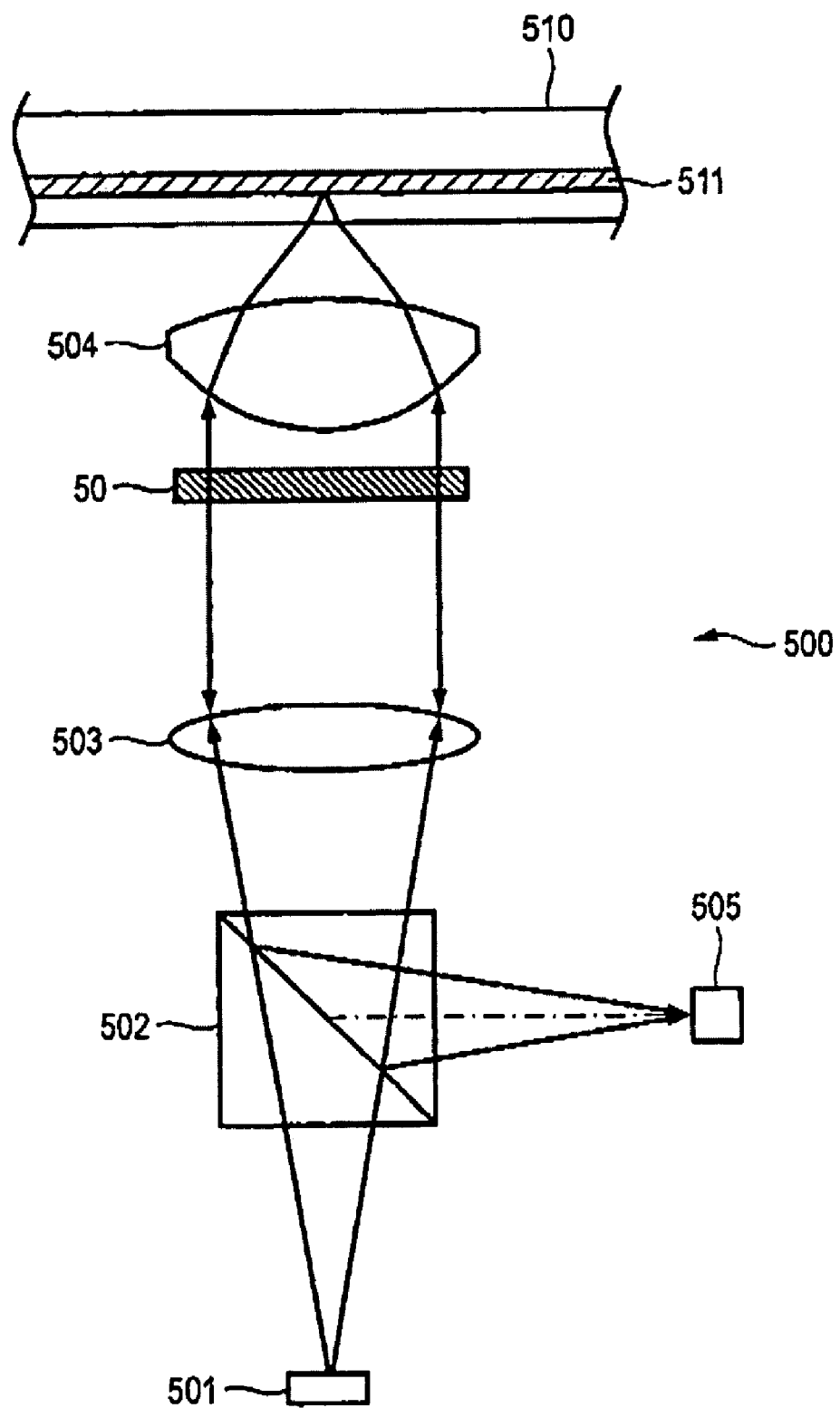
FIG. 15 is a conceptual diagram showing the structure of an optical head device according to the fifth embodiment of the present invention.

As shown in FIG. 15, the optical head device 500 according to this embodiment comprises a light source 501 for emitting a laser light, a beam splitter 502 for transmitting the laser light emitted from the light source 501 and reflecting reflected light from a recording layer 511 of an optical disc 510, a collimator lens 503 for converting the laser light to parallel light, the wavelength-selective diffraction element 50 according to this embodiment, an objective lens 504 for converging the parallel light on the recording layer 511 of the optical disc 510 and a photo detector 505 for detecting the reflected light from the recording layer 511 of the optical disc 510.

The objective lens 504 is a three-wavelength compatible objective lens in which a numerical aperture NA to a wavelength 405 nm band (a wavelength $\lambda_1$) is set to about 0.85, a numerical aperture NA to a 660 nm band (a wavelength $\lambda_2$) is set to about 0.65 and a numerical aperture NA to a 780 nm band (a wavelength $\lambda_3$) is set to about 0.40 and light converging characteristics are optimized so as to read and write data on an optical disc having a cover thickness of 0.1 mm under the wavelength 405 nm band (the wavelength $\lambda_1$). Namely, the optical head device 500 according to this embodiment has the same structure as that of the optical head device 300 whose structure is schematically shown in FIG. 9 except that the wavelength-selective diffraction element 50 of this embodiment is used in place of the wavelength-selective diffraction element 30 of the third embodiment, and that the objective lens 504 is the objective lens having a three-wavelength compatibility.

Figure 16:
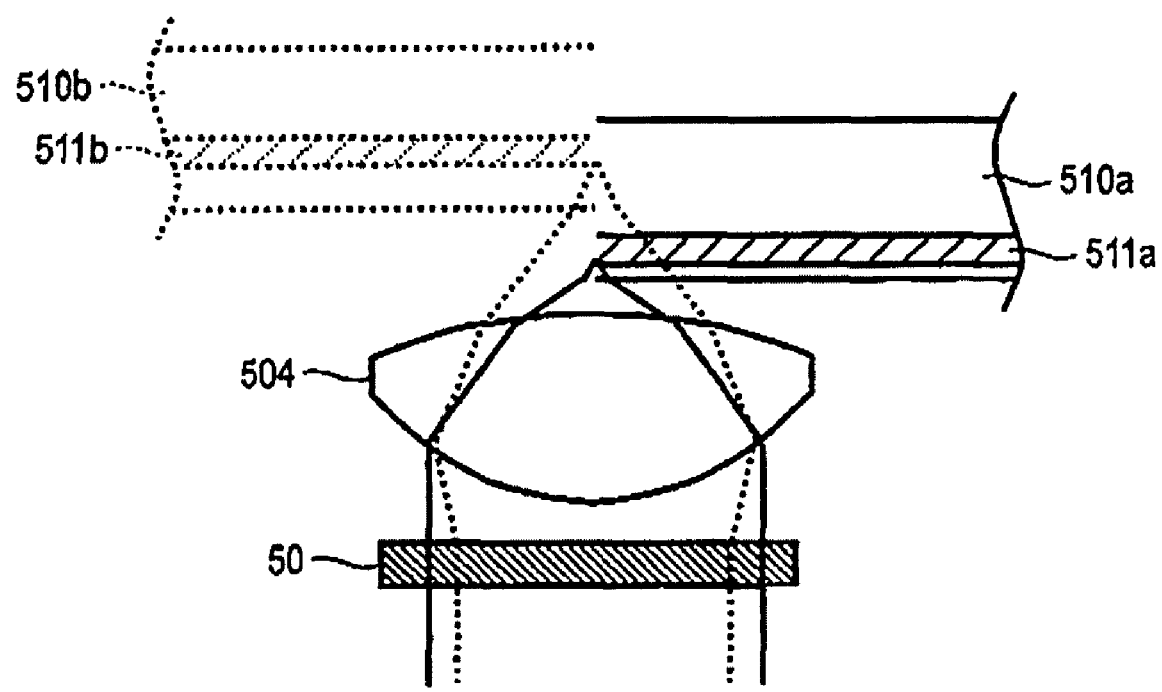
FIG. 16 is a conceptual view showing a state that incident light of a wavelength $\lambda_1$ is transmitted straightforward and diffracted by the wavelength-selective diffraction element according to the fifth embodiment of the present invention to read or write data on an optical disc different in its thickness of a cover layer or NA (numerical aperture).

Next, the light converging characteristics of the optical head device 500 using the wavelength-selective diffraction element 50 according to this embodiment is explained by referring to a schematic section view in FIG. 16. In the wavelength-selective diffraction element 50 used in this embodiment, the sectional form has such a shape that a certain serrate form is approximated by stepwise contours to improve the diffraction efficiency to light to be diffused from an optical axis, and the intensity of the straightforward transmitted light is made to be substantially equal to the intensity of the diffracted and diffused light (refer it to simply as diffracted light, hereinafter) relative to the incident light of the 405 nm band (the wavelength $\lambda_1$).

The light of the light source of the wavelength 405 nm band (the wavelength $\lambda_1$) that are transmitted straightforward by the wavelength-selective diffraction element 50 are converged by the objective lens 504 as shown by solid lines in the drawing and converged on a recording layer 511a disposed at a position near the objective lens 504 with a large numerical aperture.

Since, in the concentric circular shaped grating pattern of the wavelength-selective diffraction element 50, the cycle of the concavo-convex part are made to be smaller as coming closer to the outer peripheral part, the incident light on the outer peripheral part of the light incident on the wavelength-selective diffraction element 50 is diffracted at a larger diffraction angle than that of the light incident on a part near the central part, so that the incident light is outputted as the diffused light by the wavelength-selective diffraction element 50. Therefore, the diffracted light is converged by the objective lens 504 as shown by dashed lines in the drawing and converged on a recording layer 511b disposed at a position remoter than the straightforward transmitted light by the wavelength-selective diffraction element 50 with a small numerical aperture.

As described above, the transmitted light and the diffracted light are respectively used relative to the 405 nm band (the wavelength $\lambda_1$), so that reading and writing operations can be performed with good characteristics on both optical discs 510a and 510b having different thickness of cover layers and numerical apertures without changing the characteristics of the 660 nm band (the wavelength $\lambda_2$) and the 785 nm band (a wavelength $\lambda_3$).

As a specific structure of the above-described grating, it is exemplified a structure that $\Delta n$ is set to 0.008, the height of the grating is set to 20 μm and the cycle of the concavo-convex part is made smaller as coming closer to the outer peripheral part and the cycle in an outermost peripheral part is set to 15 μm.

The present invention is not limited to the above-described structure. In order to make a diffracting direction coincident with a converging direction, it is applicable a structure that the straightforward transmitted light is allowed to be converged to a near position with a small numerical aperture and the diffracted light is allowed to be converged to a remote position with a large numerical aperture.

As the grating, a similar grating may be formed in an entire surface of an effective area where the light is incident on a substrate surface, however, in order to suppress an aberration during converging the light to a low level, the grating may not be formed in a part near the outer periphery in an effective area 530 so that the diffracted light is not generated. Otherwise, the light may be diffracted in a direction opposite to the central part so that the light converging characteristics on the disc can be lowered to reduce an influence to a light converging spot used for reading and writing operations.

As described above, the optical system can be simplified because the optical head device according to this embodiment can read and write data on a plurality of kinds of optical discs having different numerical apertures and designed for different wavelengths with an optical system using the same objective lens. Namely, the present invention is advantageously applicable to the wavelength-selective diffraction element and the optical head device that selectively diffract light of a plurality of different wavelengths.

The present invention is described in detail by referring to the specific embodiments, however, it is to be understood to a person with ordinary skill in the art that various variations or modifications can be made without departing the spirit and the scope of the present invention.

This application is based on Japanese Patent Application No. 2005-361987 filed Dec. 15, 2005 and Japanese Patent Application No. 2006-243139 filed Sep. 7, 2006 and the contents thereof are incorporated herein as references.

INDUSTRIAL APPLICABILITY

As described above, the optical head device according to the present invention can effectively selectively diffract the light of the wavelength range wider than that of the conventional optical head device. The present invention is advantageously applied to the wavelength-selective diffraction element and the optical head device that selectively diffract light of a plurality of different wavelengths.

The invention claimed is:

1. An optical head device, comprising:
a light source, configured to emit light having three different wavelengths of $\lambda 1$=405 nm band, $\lambda 2$=660 nm band and $\lambda 3$=780 nm band;
an objective lens, configured to converge at least part of the light to a recording layer of an optical recording medium;
a photo detector, configured to detect light reflected from the optical recording medium; and
a wavelength-selective diffraction element, configured such that the light having a three wavelengths is incident on the wavelength-selective diffraction element as incident light, the wavelength-selective diffraction element comprising:
a transparent substrate;
a concavo-convex part, formed on the transparent substrate such that concave portions and convex portions are alternately extended in one direction, and comprised of a first material which is optically isotropic; and
a filling part, filling at least the concave portions and comprised of a second material which is optically isotropic, wherein:
the first material and the second material have no absorbance with respect to the three different wavelengths of the incident light,
the first material and the second material have a same refractive index with respect to light having the wavelength of $\lambda 1$ or a same refractive index with respect to light having the wavelengths of $\lambda 2$ and $\lambda 3$,
the first material and the second material have different refractive indices with respect to light having the remaining wavelength of the three different wavelengths of the incident light.

2. The optical head device as set forth in claim 1, wherein the first material and the second material have different light absorption edge wavelengths.

3. The optical head device as set forth in claim 1, wherein a modulus of a value obtained by dividing [d($\Delta$n)/d$\lambda$i] with $\Delta$n is 0.05/nm or less, in a case where $\lambda$i is one of the three different wavelengths of the incident light for which the first material and the second material have different refractive indices, and $\Delta$n is a difference between the refractive indices of the first material and the second material.

4. The optical head device as set forth in claim 1, wherein the concavo-convex part and the filling part are partially formed on an effective area of the transparent substrate adapted to receive the incident light.

5. The optical head device as set forth in claim 1, wherein:
the concave portions and the convex portions are concentrically formed in an effective area of the transparent substrate adapted to receive the incident light; and
an interval between the convex portions at a position closer to an outer peripheral part of the concavo-convex part is smaller than an interval between the convex portions at a position closer to a center part of the concavo-convex part.

6. The optical head device as set forth in claim 5, wherein:
the refractive index difference $\Delta$n between the concavo-convex part and the filling part in the 405 nm band is set to about 0.008, and
the thickness d of the concavo-convex part is set in a range of about 1 μm to 50 μm.

7. The optical head device as set forth in claim 1, wherein the wavelength-selective diffraction element is disposed on either an optical path between the light source and the objective lens, or in an optical path between the objective lens and the photo detector.

8. The optical head device as set forth in claim 1, wherein the first and second materials are selected so that the wavelength of the absorption edge of the concavo-convex part is set to 290 nm and the wavelength of the absorption edge of the filling part is set to 260 nm.

9. The optical head device as set forth in claim 1, wherein the refractive index difference $\Delta$n between the concavo-convex part and the filling part in the 405 nm band is set to about 0.01.

10. The optical head device as set forth in claim 1, wherein the refractive index difference $\Delta$n between the concavo-convex part and the filling part in the 405 nm band is set to about 0.001 or higher.

11. The optical head device as set forth in claim 1, the thickness d of the concavo-convex part is set in a range of about 1 μm to 50 μm.

12. The optical head device of claim 1, wherein the wavelength-selective diffraction element is configured to provide about 5% transmittance for of light of the first wavelength band, and about 87% transmittance for light of each of the second and third wavelength bands.

13. The optical head device as set forth in claim 1, wherein:
$\lambda_1$ is a 405 nm band of 405 nm±15 nm,
$\lambda_2$ is a 660 nm band of 660 nm±15 nm, and
$\lambda_3$ is a 780 nm band of 780 nm±20 nm.

14. The optical head device of claim 13, wherein the wavelength-selective diffraction element is configured to provide about 100% transmittance for light of the 405 nm band, about 60% transmittance for light of the 660 nm band and about 80% transmittance for light of the 780 nm band.

15. The optical head device as set forth in claim 1, wherein a sectional shape of a convex portion of a grating is a rectangular form, serrate form or a form in which a certain serrate form is approximated by stepwise contours.

16. The optical head device as set forth in claim 1, wherein an effective area where light is incident on a substrate surface is divided so as to change an extending direction or a sectional form of a grating.

17. The optical head device as set forth in claim 1, wherein a surface of the transparent substrate where a grating is formed has a curved form.

18. The optical head device as set forth in claim 1, wherein a diffraction grating including the concave-convex part and the filling part is formed only in a central rectangular area in an effective area on which light is incident.

* * * * *